US012625936B2

(12) United States Patent (10) Patent No.: US 12,625,936 B2
Goel et al. (45) Date of Patent: May 12, 2026

(54) SYSTEM AND METHOD FOR HIGHLY ACCURATE VOICE-BASED BIOMETRIC AUTHENTICATION

(71) Applicant: TURANT INC., Saratoga, CA (US)

(72) Inventors: Anurag Goel, Saratoga, CA (US); Sairam Sankaranarayanan, San Ramon, CA (US)

(73) Assignee: TURANT INC., Saratoga, CA (US)

( * ) Notice: Subject to any disclaimer, the term of this patent is extended or adjusted under 35 U.S.C. 154(b) by 21 days.

(21) Appl. No.: 18/748,894

(22) Filed: Jun. 20, 2024

(65) Prior Publication Data

US 2025/0005123 A1     Jan. 2, 2025

Related U.S. Application Data

(60) Provisional application No. 63/628,176, filed on Jun. 29, 2023.

(51) Int. Cl.
G06F 15/16 (2006.01)
G06F 9/54 (2006.01)
(Continued)

(52) U.S. Cl.
CPC ............. G06F 21/32 (2013.01); G10L 15/02 (2013.01); G10L 17/02 (2013.01); G10L 17/24 (2013.01)

(58) Field of Classification Search
CPC ......... G06F 21/32; G10L 15/02; G10L 17/02; G10L 17/24
(Continued)

(56) References Cited

U.S. PATENT DOCUMENTS 5,913,196 A  *  6/1999  Talmor ................ H04L 63/0861
                                              704/E17.003
7,054,811 B2 *  5/2006  Barzilay ................ G06Q 30/06
                                              704/246
(Continued)

FOREIGN PATENT DOCUMENTS

CN        116072122 A      5/2023
EP        4170527 A1      4/2023
(Continued)

OTHER PUBLICATIONS

Stephanos Mavromoustakos, "A Novel Method for Securing Online Databases", IRMA International Conference, 2007, Idea Group Inc., pp. 898-901 (4 pages).
(Continued)

*Primary Examiner* — Hamza N Algibhah
(74) *Attorney, Agent, or Firm* — Intellectual Property Law Group LLP

(57)          ABSTRACT
The present disclosure provides a system and a method for voice based authentication, which involves receiving voice data of a user enunciating a predetermined sequence of speech elements, with the predetermined sequence of speech elements is configured to capture a defined range of voiced sounds produced by the user; extracting voice features from the received voice data; deriving a voice signature for the user based on the extracted voice features, wherein the voice signature is representative of at least one of tonal, timbral, and temporal characteristics of the user's voiced speech; storing the derived voice signature in a database; receiving a verification voice sample of the user enunciating a predetermined sub-set of speech elements; comparing the verification voice sample with the stored voice signature; and authenticating the user based on the comparison.

16 Claims, 7 Drawing Sheets

(51) Int. Cl.

| | |
|---|---|
| *G06F 21/32* | (2013.01) |
| *G10L 15/02* | (2006.01) |
| *G10L 17/02* | (2013.01) |
| *G10L 17/24* | (2013.01) |
| *H04L 29/06* | (2006.01) |

(58) Field of Classification Search

USPC ........................................................ 726/23

See application file for complete search history.

(56) References Cited

U.S. PATENT DOCUMENTS

| | | | | |
|---|---|---|---|---|
| 10,540,488 | B2 * | 1/2020 | Hicks | G06V 40/70 |
| 10,878,825 | B2 | 12/2020 | Lesso | |
| 11,979,398 | B2 * | 5/2024 | Zhang | G06F 21/32 |
| 12,039,998 | B1 * | 7/2024 | Kao | G10L 25/21 |
| 2005/0089172 | A1 * | 4/2005 | Fujimoto | G07C 9/33 |
| | | | | 380/275 |
| 2005/0096906 | A1 * | 5/2005 | Barzilay | G10L 15/26 |
| | | | | 704/E15.045 |
| 2008/0256613 | A1 * | 10/2008 | Grover | G10L 17/00 |
| | | | | 704/235 |
| 2012/0130714 | A1 * | 5/2012 | Zeljkovic | G10L 17/04 |
| | | | | 704/235 |
| 2012/0232898 | A1 * | 9/2012 | Di Fabbrizio | G10L 15/22 |
| | | | | 704/E15.005 |
| 2013/0298213 | A1 * | 11/2013 | Macwan | G06F 21/32 |
| | | | | 726/7 |
| 2013/0339018 | A1 * | 12/2013 | Scheffer | G10L 17/24 |
| | | | | 704/E15.001 |
| 2014/0214676 | A1 * | 7/2014 | Bukai | G10L 17/24 |
| | | | | 705/44 |
| 2014/0350932 | A1 * | 11/2014 | Grover | G10L 17/00 |
| | | | | 704/246 |
| 2015/0095028 | A1 * | 4/2015 | Karpey | G10L 17/24 |
| | | | | 704/246 |
| 2018/0190298 | A1 * | 7/2018 | Huang | G10L 17/26 |
| 2018/0211021 | A1 * | 7/2018 | Negi | H04L 9/3231 |
| 2018/0233152 | A1 * | 8/2018 | Olaya | G10L 15/22 |
| 2020/0118571 | A1 * | 4/2020 | Huang | H04M 3/5175 |
| 2020/0349245 | A1 * | 11/2020 | Shila | G07C 9/257 |
| 2021/0099303 | A1 * | 4/2021 | Wang | G10L 17/06 |
| 2021/0193151 | A1 | 6/2021 | Song | |
| 2021/0287681 | A1 * | 9/2021 | Singh | G10L 17/04 |
| 2023/0186902 | A1 * | 6/2023 | Fu | G10L 15/22 |
| | | | | 704/232 |
| 2023/0247021 | A1 * | 8/2023 | Wang | H04L 63/0861 |
| | | | | 726/7 |
| 2024/0152588 | A1 * | 5/2024 | Patten | G06Q 30/0601 |
| 2025/0095640 | A1 * | 3/2025 | Wei | G10L 15/063 |

FOREIGN PATENT DOCUMENTS

| | | | | |
|---|---|---|---|---|
| GB | 2465436 A | * | 5/2010 | G06F 21/32 |
| JP | 2014500991 A | * | 1/2014 | G06F 21/32 |
| KR | 20170073927 A | * | 6/2017 | A61B 5/1123 |
| KR | 20220076160 A | * | 6/2022 | G10L 17/06 |
| WO | WO-2023047893 A1 | * | 3/2023 | G10L 21/0208 |

OTHER PUBLICATIONS

ValidSoft, "ValidSoft See-Say® Trusted Identity Assurance™" video, 2 pages screen capture, dated Dec. 13, 2022, retrievable from: <https://www.validsoft.com/blog/validsoft-see-saytrusted-identity-assurance/>.

Laxmi Doddappagol et al., "User Authentication Using Text—Prompted Technique" Asian Journal of Engineering and Technology Innovation, vol. 4(7): 15-21, 2016 (7 pages).

* cited by examiner

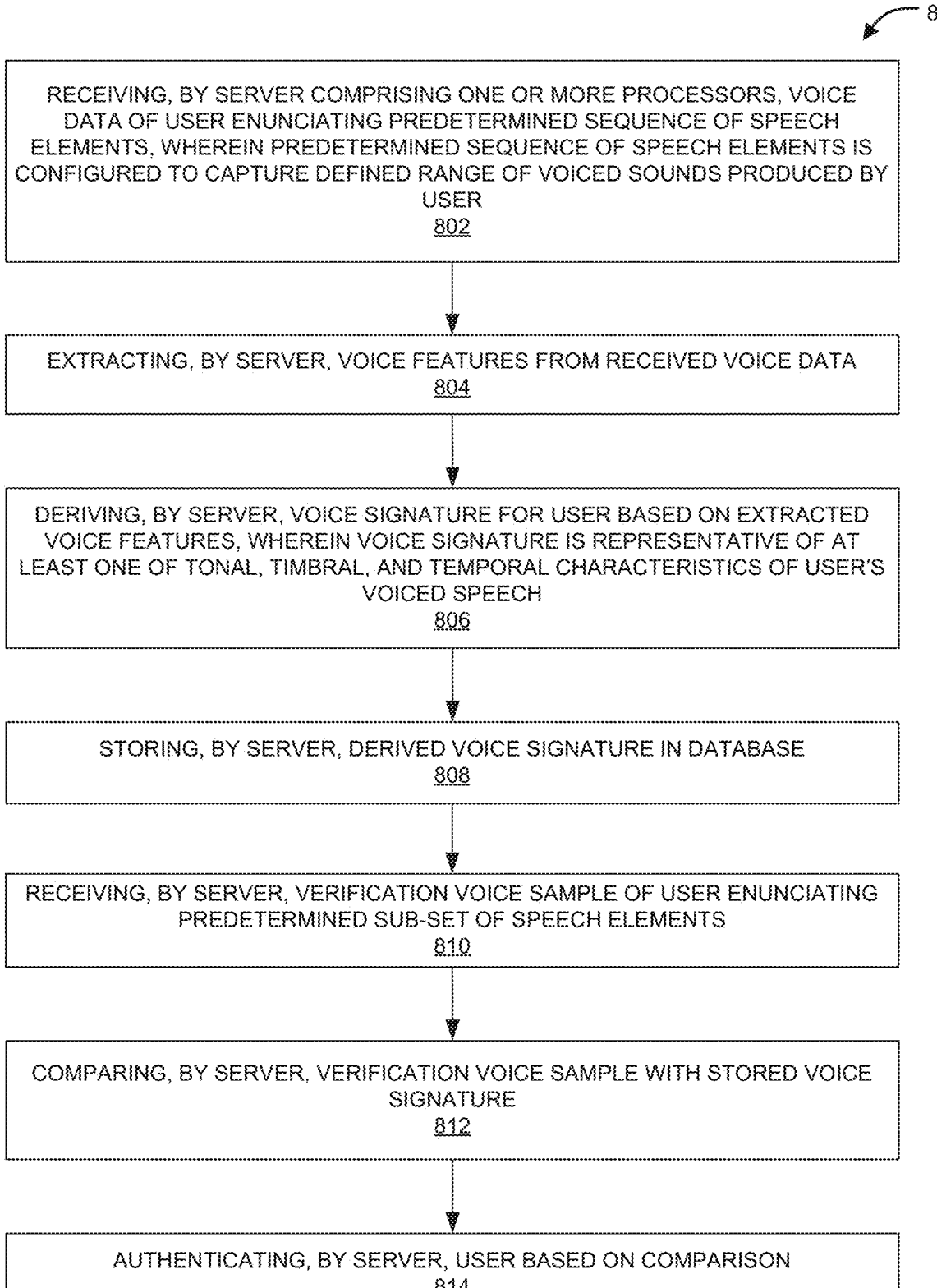

800

RECEIVING, BY SERVER COMPRISING ONE OR MORE PROCESSORS, VOICE DATA OF USER ENUNCIATING PREDETERMINED SEQUENCE OF SPEECH ELEMENTS, WHEREIN PREDETERMINED SEQUENCE OF SPEECH ELEMENTS IS CONFIGURED TO CAPTURE DEFINED RANGE OF VOICED SOUNDS PRODUCED BY USER
802

EXTRACTING, BY SERVER, VOICE FEATURES FROM RECEIVED VOICE DATA
804

DERIVING, BY SERVER, VOICE SIGNATURE FOR USER BASED ON EXTRACTED VOICE FEATURES, WHEREIN VOICE SIGNATURE IS REPRESENTATIVE OF AT LEAST ONE OF TONAL, TIMBRAL, AND TEMPORAL CHARACTERISTICS OF USER'S VOICED SPEECH
806

STORING, BY SERVER, DERIVED VOICE SIGNATURE IN DATABASE
808

RECEIVING, BY SERVER, VERIFICATION VOICE SAMPLE OF USER ENUNCIATING PREDETERMINED SUB-SET OF SPEECH ELEMENTS
810

COMPARING, BY SERVER, VERIFICATION VOICE SAMPLE WITH STORED VOICE SIGNATURE
812

AUTHENTICATING, BY SERVER, USER BASED ON COMPARISON
814

FIG. 8

SYSTEM AND METHOD FOR HIGHLY ACCURATE VOICE-BASED BIOMETRIC AUTHENTICATION

CROSS-REFERENCE TO RELATED APPLICATION

This application claims the benefit of priority under 35 U.S.C. § 119(e) based on U.S. Provisional Patent Application having Application No. 63/628,176 filed on Jun. 29, 2023, and entitled "System and method for highly accurate voice-based biometric authentication", which is hereby incorporated herein by reference in its entirety.

FIELD OF INVENTION

The present disclosure relates generally to the field of biometric authentication. In particular, the present disclosure pertains to a system and a method for voice-based biometric authentication to facilitate secure and efficient identification and verification of individuals based on their unique voice signatures. More specifically, the present disclosure pertains to language-independent, number-based voice biometric authentication.

BACKGROUND

In an increasingly interconnected world, there is a need for effective and reliable methods of user authentication. Traditional forms of authentication, such as password-based or pin-based methods, have been widely adopted, but their weaknesses are well known. They are susceptible to breaches due to their static nature, and reliance on the user's memory, making them prone to being easily forgotten, guessed, or even obtained via phishing attempts or brute-force attacks. Addressing these weaknesses, various forms of biometric authentication have been introduced. Biometrics refer to the physiological or behavioral attributes of a person that can be measured and used for identification and authentication. These include fingerprints, iris patterns, facial features, gait, and voice. While biometric authentication offers enhanced security compared to traditional methods, the practical implementation of many such systems is hampered by the need for specialized hardware, user discomfort, or privacy concerns.

Among various biometric modalities, voice-based authentication, also known as voice biometrics, is increasingly recognized for its potential to provide secure and user-friendly identity verification solutions across various digital platforms. Voice biometrics capitalizes on the uniqueness of an individual's voice. This uniqueness arises due to the individual's physical characteristics, such as the shape and size of the throat and mouth, and behavioral aspects, such as accent, speed of speech, and emphasis on certain syllables. With the proliferation of smart devices and voice-interactive systems, voice biometrics has the opportunity to become an integral part of security protocols in sectors ranging from telecommunications to national defense. In general, the voice-based authentication provides a dynamic, multifactor authentication mechanism that can significantly increase the security of a system across various digital platforms.

Despite its advantages, the conventional voice authentication technology faces significant challenges. Current voice authentication systems typically use a range of speech elements and complex algorithms to improve accuracy and reliability. These systems may apply techniques like noise filtering, voice activity detection, and dynamic feature extraction to enhance performance under varied conditions. Most rely on a combination of hardware and software to preprocess and analyze the voice data, using statistical models like Gaussian Mixture Models (GMMs) to compare current voice samples with previously stored voice signatures. Such conventional techniques for voice authentication, which involves free-flow speech, is limited in its accuracy, often not exceeding 92%. Further, the dependency on specific linguistic content and the need for continuous calibration against background models limit their applicability across different languages and dialects. Additionally, the complex preprocessing and feature extraction processes require substantial computational resources, which can hinder the scalability and efficiency of these systems, especially in resource-constrained environments.

In light of these challenges, there exists a need for an improved voice authentication system that can provide high accuracy and reliability while catering to the inherent variability of human speech and environmental factors. Such system should be capable of functioning effectively across multiple languages without the need for linguistic calibration, and it should simplify the authentication process to facilitate wider adoption in commercial and security-sensitive applications. The present disclosure aims to provide systems and methods for voice data processing and authentication accuracy addressing the limitations of existing technologies.

SUMMARY

In an aspect of the present disclosure, a voice authentication system is provided. The voice authentication system comprises a server including one or more processors and a memory storing instructions that, when executed by the one or more processors, cause the server to: receive voice data of a user enunciating a predetermined sequence of speech elements, wherein the predetermined sequence of speech elements is configured to capture a defined range of voiced sounds produced by the user; extract voice features from the received voice data; derive a voice signature for the user based on the extracted voice features, wherein the voice signature is representative of at least one of tonal, timbral, and temporal characteristics of the user's voiced speech; store the derived voice signature in a database; receive a verification voice sample of the user enunciating a predetermined sub-set of speech elements; compare the verification voice sample with the stored voice signature; and authenticate the user based on the comparison.

In one or more embodiments, the predetermined sequence of speech elements comprises a series of spoken numerals.

In one or more embodiments, the series of spoken numerals includes numerals from 0 to 9.

In one or more embodiments, the instructions for extracting the voice features cause the server to: pre-emphasize the received voice data; frame the pre-emphasized voice data into overlapping time frames; apply a window function to each time frame to reduce boundary discontinuities; perform a Fourier transform on each windowed time frame to convert to a frequency domain representation; apply a set of band-pass filters modelling human auditory perception to the frequency domain representation; and perform a decorrelation transform to derive Mel Frequency Cepstral Coefficients (MFCCs) as the voice features.

In one or more embodiments, the instructions for deriving the voice signature cause the server to perform statistical modelling of the extracted voice features using a Gaussian Mixture Model (GMM).

In one or more embodiments, the instructions for comparing the verification voice sample cause the server to: extract voice features from the verification voice sample; compare the extracted voice features against the stored voice signature and a universal background model representing average voice characteristics; and determine a match score based on the comparison.

In one or more embodiments, the instructions further cause the server to authenticate the user when the match score exceeds a predetermined threshold.

In one or more embodiments, the instructions further cause the server to: measure a response timing of the user enunciating the predetermined sub-set of speech elements; determine whether the response timing exceeds a predetermined threshold; re-prompt the user to enunciate the predetermined sub-set of speech elements again if response timing exceeds the predetermined threshold; and fail the authentication of the user if the response timing exceeds the predetermined threshold after a predefined number of re-prompts.

In one or more embodiments, the system is configured to provide voice authentication services to third-party systems via an application programming interface (API).

In one or more embodiments, the memory further stores instructions that, when executed by the one or more processors, cause the server to implement a microservices-based architecture for the voice authentication system, the microservices-based architecture comprising a plurality of independent modules for performing different tasks in the voice authentication process.

In another aspect of the present disclosure, a method for authenticating a user by voice in a voice authentication system is provided. The method includes receiving, by a server comprising one or more processors, voice data of a user enunciating a predetermined sequence of speech elements, wherein the predetermined sequence of speech elements is configured to capture a defined range of voiced sounds produced by the user. The method further includes extracting, by the server, voice features from the received voice data. The method further includes deriving, by the server, a voice signature for the user based on the extracted voice features, wherein the voice signature is representative of at least one of tonal, timbral, and temporal characteristics of the user's voiced speech. The method further includes storing, by the server, the derived voice signature in a database. The method further includes receiving, by the server, a verification voice sample of the user enunciating a predetermined sub-set of speech elements. The method further includes comparing, by the server, the verification voice sample with the stored voice signature. The method further includes authenticating, by the server, the user based on the comparison.

In one or more embodiments, the predetermined sequence of speech elements comprises a series of spoken numerals.

In one or more embodiments, the series of spoken numerals includes numerals from 0 to 9.

In one or more embodiments, the method further includes: pre-emphasizing, by the server, the received voice data; framing, by the server, the pre-emphasized voice data into overlapping time frames; applying, by the server, a window function to each time frame to reduce boundary discontinuities; performing, by the server, a Fourier transform on each windowed time frame to convert to a frequency domain representation; applying, by the server, a set of bandpass filters modelling human auditory perception to the frequency domain representation; and performing, by the server, a decorrelation transform to derive Mel Frequency Cepstral Coefficients (MFCCs) as the voice features.

In one or more embodiments, the method further includes performing, by the server, statistical modelling of the extracted voice features using a Gaussian Mixture Model (GMM).

In one or more embodiments, the method further includes extracting, by the server, voice features from the verification voice sample; comparing, by the server, the extracted voice features against the stored voice signature and a universal background model representing average voice characteristics; and determining, by the server, a match score based on the comparison.

In one or more embodiments, the method further includes authenticating, by the server, the user when the match score exceeds a predetermined threshold.

In one or more embodiments, the method further includes measuring, by the server, a response timing of the user enunciating the predetermined sub-set of speech elements; determining, by the server, whether the response timing exceeds a predetermined threshold; re-prompting, by the server, the user to enunciate the predetermined sub-set of speech elements again if response timing exceeds the predetermined threshold; and failing, by the server, the authentication of the user if the response timing exceeds the predetermined threshold after a predefined number of re-prompts.

In one or more embodiments, the method further includes providing, by the server, voice authentication services to third-party systems via an application programming interface (API).

In one or more embodiments, the method further includes implementing, by the server, a microservices-based architecture for the voice authentication system, the microservices-based architecture comprising a plurality of independent modules for performing different tasks in the voice authentication process.

Still, other aspects, features, and advantages of the invention are readily apparent from the following detailed description, simply by illustrating a number of particular embodiments and implementations, including the best mode contemplated for carrying out the invention. The invention is also capable of other and different embodiments, and its several details may be modified in various obvious respects, all without departing from the scope of the invention. Accordingly, the drawings and description are to be regarded as illustrative in nature, and not as restrictive.

BRIEF DESCRIPTION OF THE FIGURES

For a more complete understanding of example embodiments of the present disclosure, reference is now made to the following descriptions taken in connection with the accompanying drawings in which:

FIG. 8 illustrates a flowchart of a method for authenticating a user by voice in a voice authentication system, in accordance with one or more exemplary embodiments of the present disclosure.

DETAILED DESCRIPTION

Figure 1:
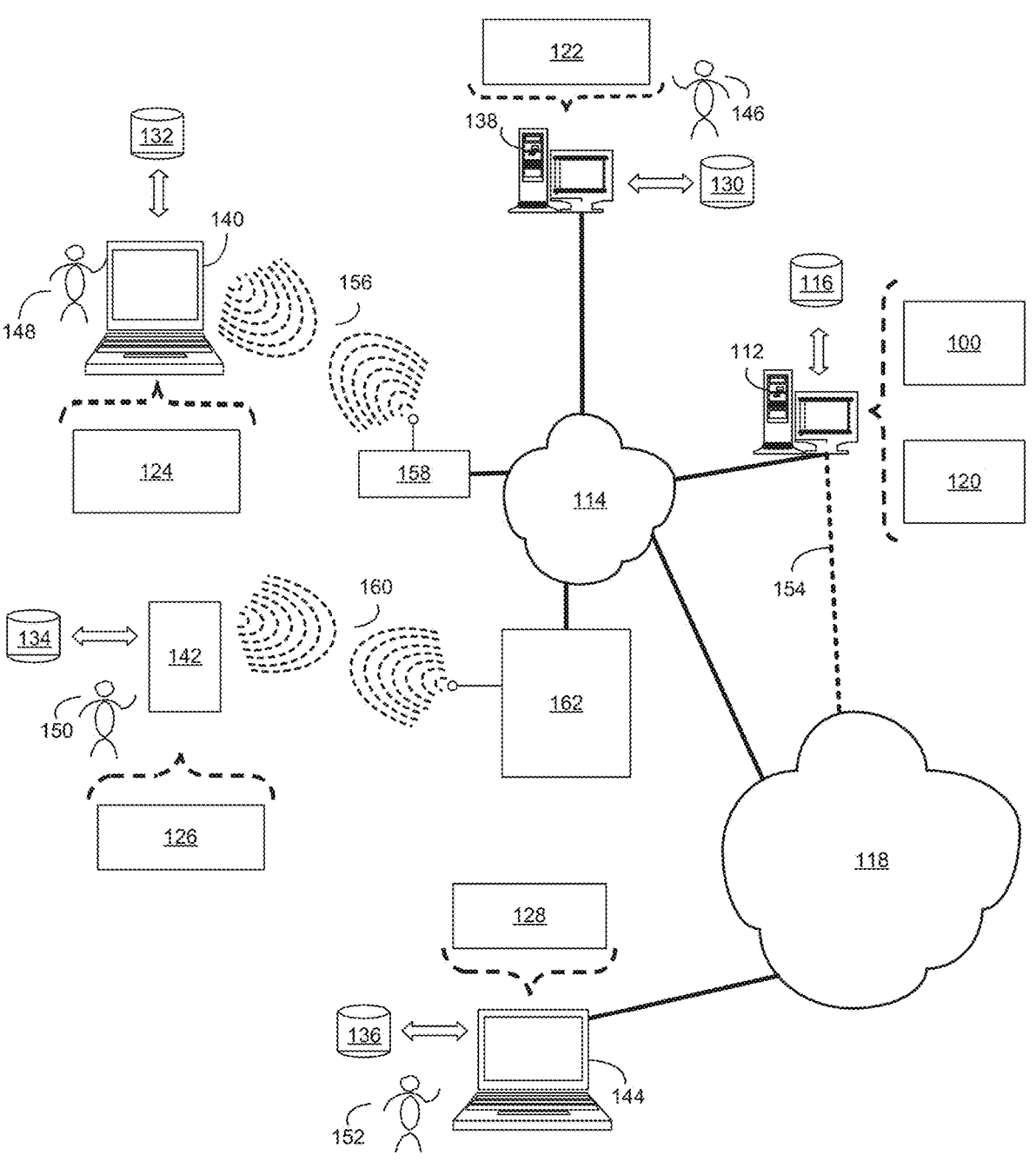
FIG. 1 illustrates a system that may reside on and may be executed by a computer, which may be connected to a network, in accordance with one or more exemplary embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The present disclosure provides a voice biometric platform designed specifically for individual identification and verification. This system leverages artificial intelligence algorithms in conjunction with advanced security measures to provide enhanced accuracy, superior security, and a user-friendly experience for voice authentication.

The present disclosure addresses the challenges of improving the accuracy and reliability of known voice-based authentication systems by standardizing the speech input during the authentication process, thereby reducing variability and enhancing the performance of the voice biometric system. The present disclosure utilizes an approach using a fixed set of speech elements (numbers, words or phrases) during the authentication process which can facilitate this standardization.

Specifically, the present disclosure provides an approach to voice authentication, leveraging the unique benefits of using a spoken sequence of numbers as the voice input. The use of numbers as the speech input offers several advantages. Numbers are universal and are used in virtually all languages. In addition, the pronunciation of numbers involves a wide range of vocal cord movements, providing a rich set of voice data for analysis. By focusing on the spoken numbers, it is possible to extract more consistent and distinctive voice features, which can enhance the accuracy of the voice authentication system.

One method to implement this approach involves having the user enunciate all numbers, i.e., from 0-9, during a registration phase of the voice authentication process. The collected voice samples are processed to extract voice features and derive a unique voice signature for the user. This voice signature, based on the tonal, timbral, and temporal characteristics of the user's spoken set of numbers, is then stored securely and used for subsequent authentication in a verification phase. During the verification phase, the user is prompted to provide a verification voice sample by enunciating a specific sequence of numbers, and this sample is compared against the stored voice signature. If a match is found, the user is authenticated. Herein, the said sequence of numbers may, for example, be provided to the user via SMS, OTP, authenticator application, or the like. The specific sequence of numbers can be random or predefined, and can be of a length that requires the user to speak for a minimum duration, thereby ensuring a sufficient amount of voice data for analysis.

So, while there are existing methods of voice authentication, the potential for increased accuracy and speed makes this an area of continuing innovation and development. The present disclosure introduces enhanced mechanisms for voice feature extraction, voice signature creation, and verification. Such an approach to voice authentication offers a higher level of accuracy compared to traditional free-flow speech methods. The present disclosure, thus, makes a significant contribution to the field of voice authentication, providing improved accuracy, user convenience, and security.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Some portions of the detailed description that follows are presented and discussed in terms of a process or method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. In present implementations, the used language for training may be one of Python, Tensorflow, Bazel, C, C++. Further, decoder in user device (as will be discussed) may use C, C++ or any processor specific ISA. Furthermore, assembly code inside C/C++ may be utilized for specific operation. Also, ASR (automatic speech recognition) and G2P decoder along with entire user system can be run in embedded Linux (any distribution), Android, IOS, Windows, or the like, without any limitations. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to example implementation of FIG. 1, there is shown a computing arrangement 100 that may reside on and may be executed by a computer (e.g., computer 112), which may be connected to a network (e.g., network 114) (e.g., the internet or a local area network). Examples of computer 112 may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, a portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 112 may execute an operating system, for example, but not limited to, Microsoft Windows®; Mac OS X®; Red Hat Linux®, or a custom operating system.

In some implementations, the instruction sets and subroutines of computing arrangement 100, which may be stored on storage device, such as storage device 116, coupled to computer 112, may be executed by one or more processors (not shown) and one or more memory architectures included within computer 112. In some implementations, storage device 116 may include but is not limited to: a hard disk drive; a flash drive, a tape drive; an optical drive; a RAID array (or other array); a random-access memory (RAM); and a read-only memory (ROM).

In some implementations, network 114 may be connected to one or more secondary networks (e.g., network 118), examples of which may include but are not limited to: a local area network; a wide area network; or an intranet, for example.

In some implementations, computer 112 may include a data store, such as a database (e.g., relational database, object-oriented database, triplestore database, etc.) and may be located within any suitable memory location, such as storage device 116 coupled to computer 112. In some implementations, data, metadata, information, etc. described throughout the present disclosure may be stored in the data store. In some implementations, computer 112 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, computing arrangement 100 may be a component of the data store, a standalone application that interfaces with the above noted data store and/or an applet/application that is accessed via client applications 122, 124, 126, 128. In some implementations, the above noted data store may be, in whole or in part, distributed in a cloud computing topology. In this way, computer 112 and storage device 116 may refer to multiple devices, which may also be distributed throughout the network.

In some implementations, computer 112 may execute application 120 for voice authentication. In some implementations, computing arrangement 100 and/or application 120 may be accessed via one or more of client applications 122, 124, 126, 128. In some implementations, computing arrangement 100 may be a standalone application, or may be an applet/application/script/extension that may interact with and/or be executed within application 120, a component of application 120, and/or one or more of client applications 122, 124, 126, 128. In some implementations, application 120 may be a standalone application, or may be an applet/application/script/extension that may interact with and/or be executed within computing arrangement 100, a component of computing arrangement 100, and/or one or more of client applications 122, 124, 126, 128. In some implementations, one or more of client applications 122, 124, 126, 128 may be a standalone application, or may be an applet/application/script/extension that may interact with and/or be executed within and/or be a component of computing arrangement 100 and/or application 120. Examples of client applications 122, 124, 126, 128 may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications 122, 124, 126, 128, which may be stored on storage devices 130, 132, 134, 136, coupled to user devices 138, 140, 142, 144, may be executed by one or more processors and one or more memory architectures incorporated into user devices 138, 140, 142, 144.

In some implementations, one or more of storage devices 130, 132, 134, 136, may include but are not limited to: hard disk drives; flash drives, tape drives; optical drives; RAID arrays; random access memories (RAM); and read-only memories (ROM). Examples of user devices 138, 140, 142, 144 (and/or computer 112) may include, but are not limited to, a personal computer (e.g., user device 138), a laptop computer (e.g., user device 140), a smart/data-enabled, cellular phone (e.g., user device 142), a notebook computer (e.g., user device 144), a tablet (not shown), a server (not shown), a television (not shown), a smart television (not shown), a media (e.g., video, photo, etc.) capturing device (not shown), and a dedicated network device (not shown). User devices 138, 140, 142, 144 may each execute an operating system, examples of which may include but are not limited to, Android, Apple IOS, Mac OS X; Red Hat Linux, or a custom operating system.

In some implementations, one or more of client applications 122, 124, 126, 128 may be configured to effectuate some or all of the functionality of computing arrangement 100 (and vice versa). Accordingly, in some implementations, computing arrangement 100 may be a purely server-side application, a purely client-side application, or a hybrid server-side/client-side application that is cooperatively executed by one or more of client applications 122, 124, 126, 128 and/or computing arrangement 100.

In some implementations, one or more of client applications 122, 124, 126, 128 may be configured to effectuate some or all of the functionality of application 120 (and vice versa). Accordingly, in some implementations, application 120 may be a purely server-side application, a purely client-side application, or a hybrid server-side/client-side application that is cooperatively executed by one or more of client applications 122, 124, 126, 128 and/or application 120. As one or more of client applications 122, 124, 126, 128, computing arrangement 100, and application 120, taken singly or in any combination, may effectuate some or all of the same functionality, any description of effectuating such functionality via one or more of client applications 122, 124, 126, 128, computing arrangement 100, application 120, or combination thereof, and any described interaction(s) between one or more of client applications 122, 124, 126, 128, computing arrangement 100, application 120, or combination thereof to effectuate such functionality, should be taken as an example only and not to limit the scope of the disclosure.

In some implementations, one or more of users 146, 148, 150, 152 may access computer 112 and computing arrangement 100 (e.g., using one or more of user devices 138, 140, 142, 144) directly through network 114 or through secondary network 118. Further, computer 112 may be connected to network 114 through secondary network 118, as illustrated with phantom link line 154. Computing arrangement 100 may include one or more user interfaces, such as browsers and textual or graphical user interfaces, through which users 146, 148, 150, 152 may access computing arrangement 100.

In some implementations, the various user devices may be directly or indirectly coupled to communication network, such as communication network 114 and communication network 118, hereinafter simply referred to as network 114 and network 118, respectively. For example, user device 138 is shown directly coupled to network 114 via a hardwired network connection. Further, user device 144 is shown directly coupled to network 118 via a hardwired network connection. User device 140 is shown wirelessly coupled to network 114 via wireless communication channel 156 established between user device 140 and wireless access point (i.e., WAP) 158, which is shown directly coupled to network 114. WAP 158 may be, for example, an IEEE 802.11a, 802.11b, 802.11g, Wi-Fi, RFID, and/or Bluetooth (including Bluetooth Low Energy) device that is capable of establishing wireless communication channel 156 between user device 140 and WAP 158. User device 142 is shown wirelessly coupled to network 114 via wireless communication channel 160 established between user device 142 and cellular network/bridge 162, which is shown directly coupled to network 114.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth (including Bluetooth Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
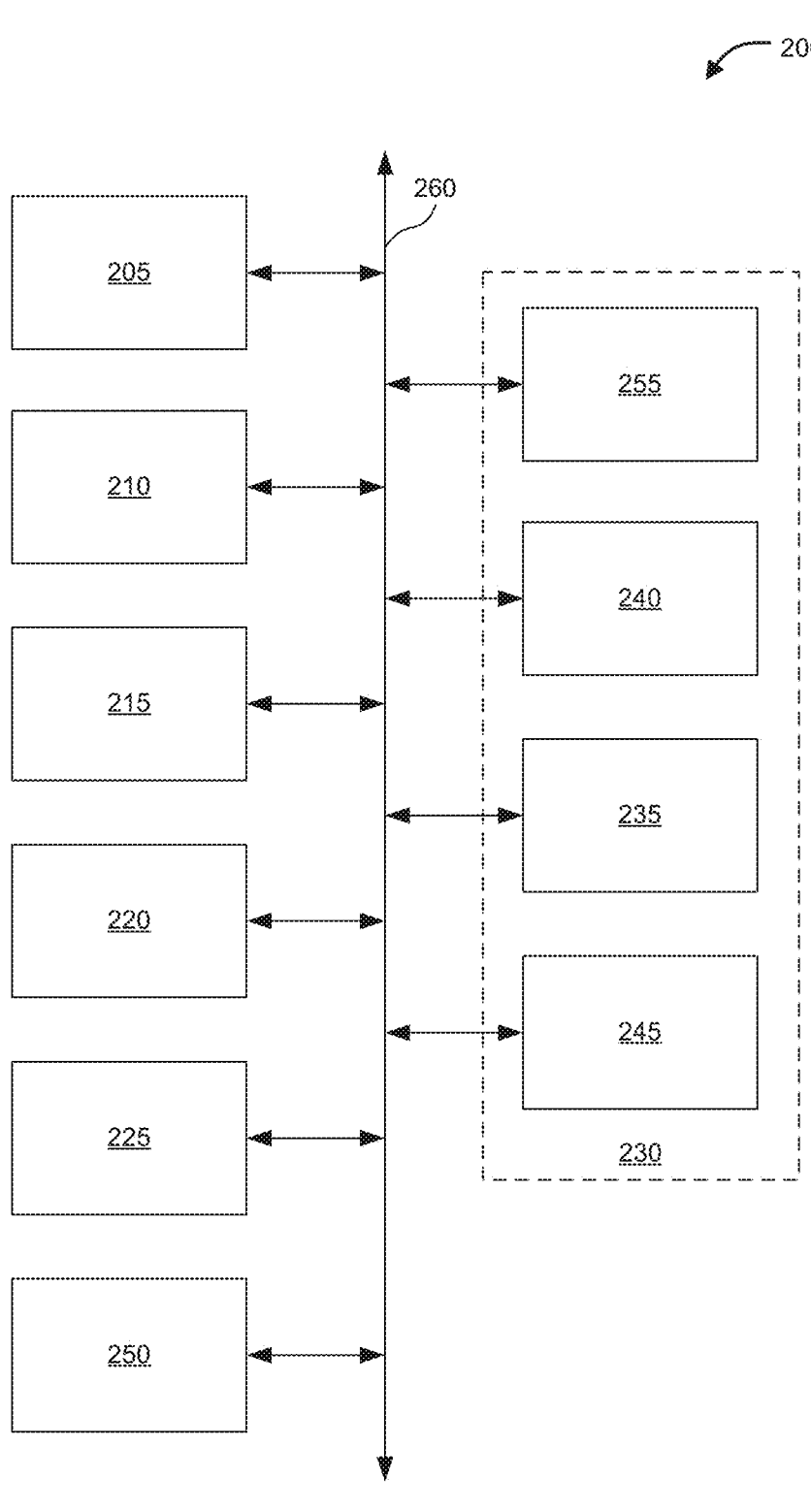
FIG. 2 illustrates a diagrammatic view of a server, in accordance with one or more exemplary embodiments of the present disclosure.

The computing arrangement 100 may include a server (such as server 200, as shown in FIG. 2) for voice-authentication. In the present implementations, the computing arrangement 100 itself may be embodied as the server 200. Herein, FIG. 2 is a block diagram of an example of the server 200 capable of implementing embodiments according to the present disclosure. In the example of FIG. 2, the server 200 may include a processing unit 205 for running software applications (such as, the application 120 of FIG. 1) and optionally an operating system. As illustrated, the server 200 may further include a database 210 which stores applications and data for use by the processing unit 205. Storage 215 provides non-volatile storage for applications and data and may include fixed disk drives, removable disk drives, flash memory devices, and CD-ROM, DVD-ROM or other optical storage devices. An optional user input device 220 may include devices that communicate user inputs from one or more users to the server 200 and may include keyboards, mice, joysticks, touch screens, etc. A communication or network interface 225 is provided which allows the server 200 to communicate with other computer systems via an electronic communications network, including wired and/or wireless communication and including an Intranet or the Internet. In one embodiment, the server 200 receives instructions and user inputs from a remote computer through communication interface 225. Communication interface 225 can comprise a transmitter and receiver for communicating with remote devices. An optional display device 250 may be provided which can be any device capable of displaying visual information in response to a signal from the server 200. The components of the server 200, including the processing unit 205, the database 210, the data storage 215, the user input devices 220, the communication interface 225, and the display device 250, may be coupled via one or more data buses 260.

In the embodiment of FIG. 2, a graphics system 230 may be coupled with the data bus 260 and the components of the server 200. The graphics system 230 may include a physical graphics processing arrangement (GPU) 235 and graphics memory. The GPU 235 generates pixel data for output images from rendering commands. The physical GPU 235 can be configured as multiple virtual GPUs that may be used in parallel (concurrently) by a number of applications or processes executing in parallel. For example, mass scaling processes for rigid bodies or a variety of constraint solving processes may be run in parallel on the multiple virtual GPUs. Graphics memory may include a display memory 240 (e.g., a framebuffer) used for storing pixel data for each pixel of an output image. In another embodiment, the display memory 240 and/or additional memory 245 may be part of the database 210 and may be shared with the processing unit 205. Alternatively, the display memory 240 and/or additional memory 245 can be one or more separate memories provided for the exclusive use of the graphics system 230. In another embodiment, the graphics processing arrangement 230 may include one or more additional physical GPUs 255, similar to the GPU 235. Each additional GPU 255 may be adapted to operate in parallel with the GPU 235. Each additional GPU 255 generates pixel data for output images from rendering commands. Each additional physical GPU 255 can be configured as multiple virtual GPUs that may be used in parallel (concurrently) by a number of applications or processes executing in parallel, e.g., processes that solve constraints. Each additional GPU 255 can operate in conjunction with the GPU 235, for example, to simultaneously generate pixel data for different portions of an output image, or to simultaneously generate pixel data for different output images. Each additional GPU 255 can be located on the same circuit board as the GPU 235, sharing a connection with the GPU 235 to the data bus 260, or each additional GPU 255 can be located on another circuit board separately coupled with the data bus 260. Each additional GPU 255 can also be integrated into the same module or chip package as the GPU 235. Each additional GPU 255 can have additional memory, similar to the display memory 240 and additional memory 245, or can share the memories 240 and 245 with the GPU 235. It is to be understood that the circuits and/or functionality of GPU as described herein could also be implemented in other types of processors, such as general-purpose or other special-purpose coprocessors, or within a CPU.

Figure 3:
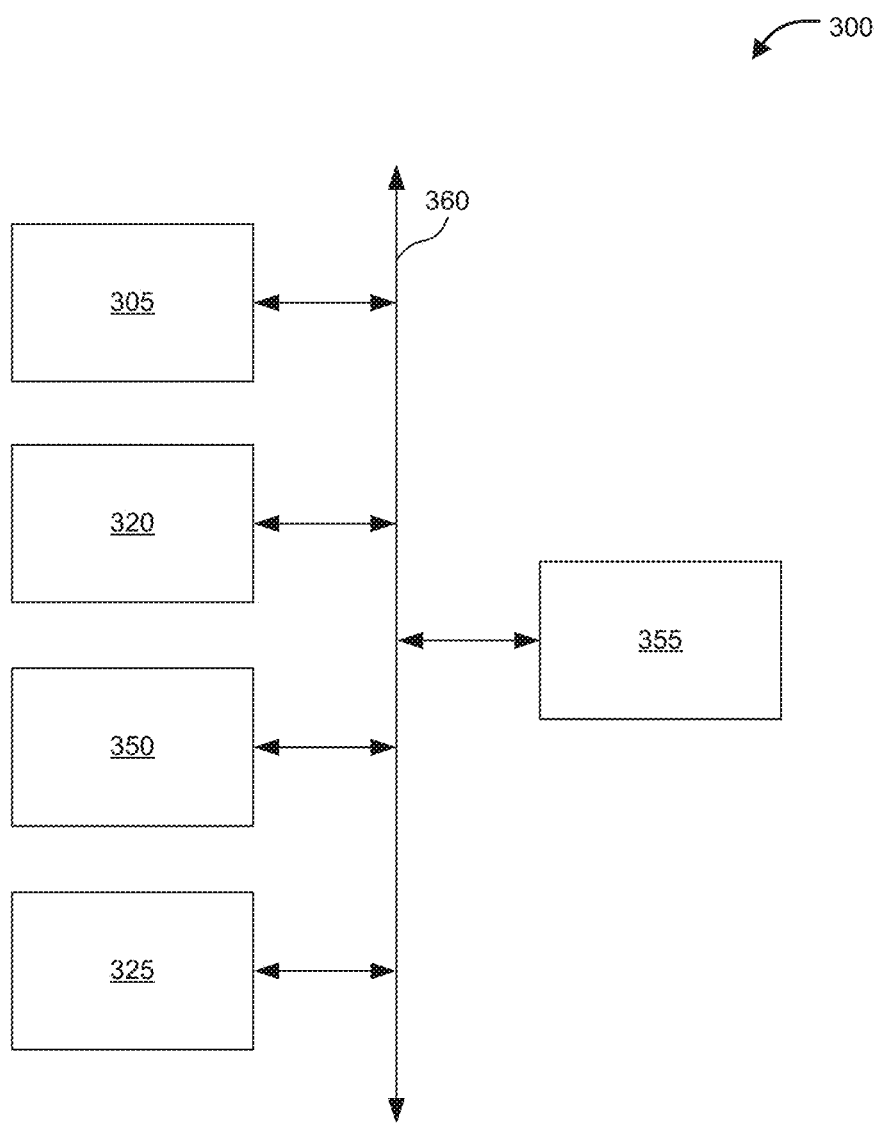
FIG. 3 illustrates a diagrammatic view of a user device, in accordance with one or more exemplary embodiments of the present disclosure.

The computing arrangement 100 may also include a user device 300 (as shown in FIG. 3). Herein, FIG. 3 is a block diagram of an example of the user device 300 capable of implementing embodiments according to the present disclosure. In the example of FIG. 3, the user device 300 may include a processor 305 (hereinafter, referred to as CPU 305) for running software applications (such as, the application 120 of FIG. 1) and optionally an operating system. A user input device 320 is provided which may include devices that communicate user inputs from one or more users. In the present embodiments, the user input device 320 may be in the form of a microphone (or a set/array of microphones). In some examples, the user input device 320 may further include keyboards, mice, joysticks, touch screens, etc., without any limitations. Further, a network adapter 325 is provided which allows the user device 300 to communicate with other computer systems (e.g., the server 200 of FIG. 2) via an electronic communications network, including wired and/or wireless communication and including the Internet. The user device 300 may also include a decoder 355 may be any device capable of decoding (decompressing) data that may be encoded (compressed). A user output device 350 may be provided which may be any device capable of communicating information, including information received from the decoder 355. Herein, the user output device 350 may be in the form of a speaker or a display device. In particular, as will be described below, the user output device 350 as the display device may provide an interface, such that the user output device 350 is configured to display information received from the server 200 of FIG. 2. The components of the user device 300 may be coupled via one or more data buses 360.

In embodiments of the present disclosure, the user device 300 may embody a wide variety of devices which may use voice authentication. In an example, the user device 300 may include: a) smartphones and tablets which may have applications ranging from device unlocking, authenticating transactions in mobile banking or e-commerce apps, to authorizing app downloads; b) personal computers and laptops which may use voice authentication for system login, software access control, or for authorizing digital transactions; c) smart home devices such as smart speakers (Amazon echo, Google home), smart displays, or even smart TVs which could use voice authentication to ensure that only authorized users can control the device or access its connected services; d) automobiles in which voice authentication can be used to start the car or activate certain functions like navigation, climate control, or multimedia system; e) smart door locks which can use voice authentication as a keyless entry method. it can also be used in a multi-factor authentication setting along with a regular key or pin code; f) wearable devices like smartwatches or fitness trackers which could use voice authentication to unlock the device or authorize data sharing; g) ATMs and kiosks in which voice authentication could be used as an additional layer of security along with a card or pin; h) industrial control systems in which voice authentication could be used to control access to systems or machines; i) access control systems, like in a corporate setting, in which voice authentication could be used in combination with other methods like RFID cards to control access to buildings or restricted areas; j) IoT devices in which voice authentication can be implemented in a multitude of devices ranging from smart refrigerators, thermostats, lighting systems, to security cameras.

Figure 4:
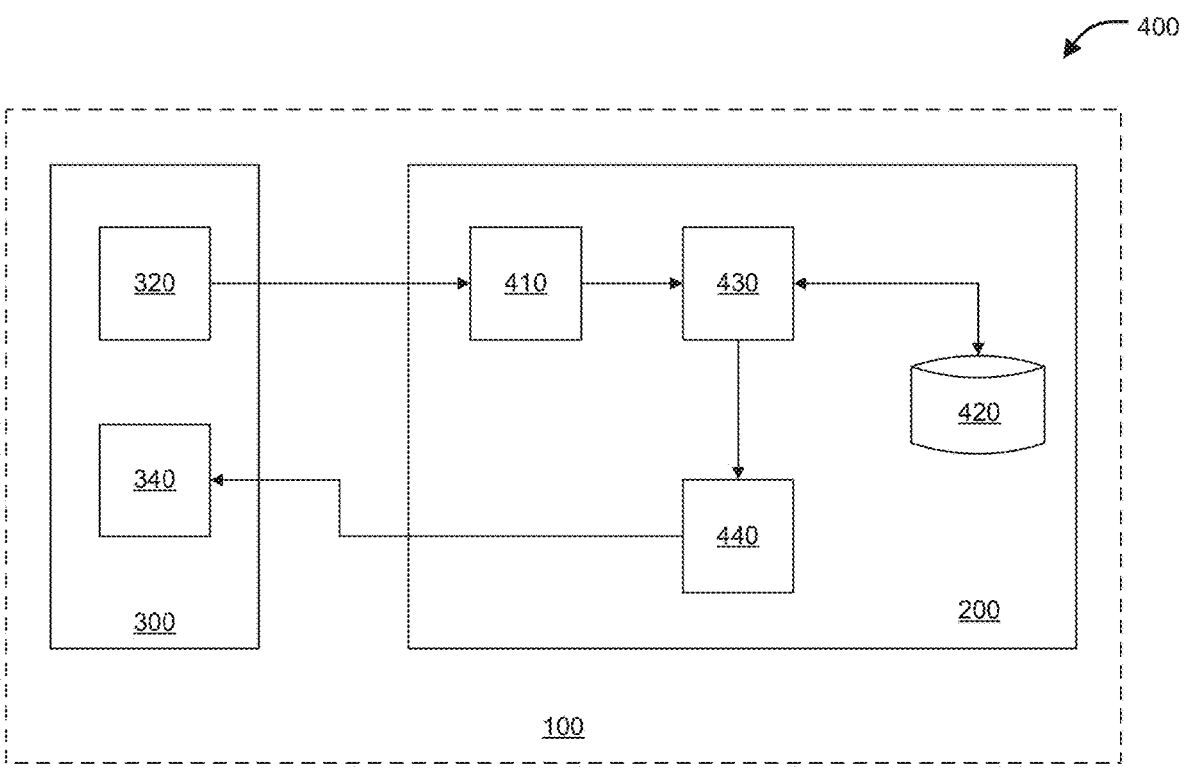
FIG. 4 illustrates a simplified schematic block diagram of a system for voice authentication, in accordance with one or more exemplary embodiments of the present disclosure.

Referring to FIG. 4, illustrated is a simplified schematic block diagram of a voice authentication system 400, as per embodiments of the present disclosure. The voice authentication system 400 (sometimes, simply, referred to as "system 400" or "system" without any limitations) is designed to implement the functionalities of the computing arrangement 100, which includes the server 200 and the user device 300 as integral components of the overall system architecture, to accomplish the purpose of secure voice-based user authentication. The server 200 plays a significant role in the voice authentication system 400 by providing the core processing capabilities and data storage necessary for the voice authentication process. The user device 300 is configured to interact with the server 200 and is integral in initiating the voice authentication process. The user device 300 captures the user's voice through the user input device 320. The user input device 320 represents the hardware and software that facilitates audio capture and initial processing. The server 200 receives the voice data from the user device 300, or specifically the user input device 320 therein, and performs a series of operations. The voice authentication system 400 may employ a secure mechanism by which the voice data is transmitted from the user device 300 to the server 200. This may involve encryption or other security measures to ensure the data cannot be intercepted or tampered with during transmission. The server 200 includes one or more processors and a memory that stores instructions, which when executed by the processors, facilitate various operations of the voice authentication process.

In particular, as shown, the server 200 includes a voice data processing module 410 which receives the raw voice data and performs initial processing. This processing can include tasks like noise reduction, normalization, and conversion into a format suitable for transmission or analysis. The server 200 also includes a database 420 where the voice data is stored for comparison. The database 420 may be located on the server 200 itself, or it may be a separate module that the server 200 communicates with. Further, the server 200 includes a voice authentication module 430 which represents algorithms that analyze the voice data, compare it against stored voice data in the database 420, and determine whether it's a match. After the voice data is processed by the voice authentication module 430, a decision 440 is outputted. This decision 440, a binary 'authenticated' or 'not authenticated', is then communicated back to the user device 300. Depending on the output decision 440, the user is given feedback on the user output device 350 in the form of either access is granted, or the authentication fails and the user is notified.

In one or more embodiments of the present disclosure, the voice authentication module 430 may employ a Dialog Manager (DM) which acts as the central hub that orchestrates the interactions among all other components. The DM serves as the primary interface for external interactions and routes data between the various components of the voice authentication system 400. As such, the DM plays a role in managing the workflows of the voice authentication system 400 and ensuring a smooth process flow. The voice authentication module 430 may further employ an AI processing engine which houses AI-driven speaker verification algorithms. These algorithms perform tasks such as feature extraction and statistical modeling of acoustical features (as discussed later in more detail), which are required for the creation and verification of unique voice signatures.

The voice authentication module 430 may further provide a User Interface (UI) which serves as a front-end of the voice authentication system 400, providing a user-friendly interface for administrators to manage the voice authentication system 400, monitor its performance, and conduct troubleshooting, if necessary. The voice authentication module 430 may further employ a Smart Interactive Voice Response (IVR) module which functions as the primary user interface for the collection of voice samples. By leveraging advancements in AI and machine learning (ML), the Smart IVR module offers a highly interactive and user-friendly medium for users to provide their voice samples.

In some examples, the voice authentication module 430 may employ a security module which oversees the enforcement of security policies, guidelines, and measures within the voice authentication system 400. The security module may also handle various security-related tasks such as encryption, secure data transmission, and access control. The voice authentication module 430 may further employ an audit and reporting module which facilitates monitoring and reporting for the voice authentication system 400. The audit and reporting module may allow the tracking and logging of various activities of the voice authentication system 400, thereby enhancing transparency and accountability.

In the voice authentication module 430, when a voice sample is received via the Smart IVR module, the DM routes it to the AI Processing Engine for processing. Similarly, the DM directs the processed voice signatures to the database 420 for storage and retrieves them as needed for verification. Further, upon receiving a voice sample from the DM, the AI processing engine executes AI-driven speaker verification algorithms to extract unique acoustical features from the sample and model them into a unique voice signature. This voice signature is then sent back to the DM for storage in the database 420. During the verification process, the AI Processing Engine compares the live voice sample with the stored voice signature to verify the user's identity. Additionally, the DM also interacts with the audit and reporting module to log activities of the voice authentication system 400 and with the security module to ensure the enforcement of security policies and guidelines therein. Specifically, the DM logs activities of the voice authentication system 400 in the audit and reporting module, which then generates reports and logs for system monitoring and troubleshooting. Further, the DM ensures the enforcement of security policies and guidelines through the security module, which performs tasks such as encryption, secure data transmission, and access control.

Description below provides further details of working of the voice authentication system 400 as per embodiments of the present disclosure. Herein, the voice authentication system 400 is configured to perform several functions that facilitate secure and reliable user identification and verification based on voice data. These functions are designed to process and analyze the unique characteristics of a user's voice, enabling the system to accurately identify and authenticate individuals in a secure manner.

The voice authentication system 400 begins its operation by receiving voice data of a user who enunciates a predetermined sequence of speech elements. As used herein, the "predetermined sequence of speech elements" refers to a specific sequence of vocal sounds or words that the user is asked to enunciate during the initial registration or during a full verification process. The sequence is chosen to ensure it effectively captures a range of voice characteristics, such as tonal, timbral, and temporal aspects. The sequence is "predetermined" in that it is set before the interaction with the user and is designed to invoke a wide array of vocal properties that can uniquely identify the user. The predetermined sequence of speech elements in the voice authentication system 400 is specifically designed to capture a defined range of voiced sounds produced by the user. This ensures that the voice data captured includes a variety of phonetic elements and vocal nuances necessary for effective voice recognition. By including a wide spectrum of voiced sounds, the voice authentication system 400 can gather detailed acoustical information from the user's voice. This information includes but is not limited to pitch variations, intonation, and rhythm, which is required for creating an accurate voice profile. The choice of the predetermined sequence of speech elements is guided by the need to maximize the capture of distinctive voice features that are unique to the individual. This maximization enhances ability to differentiate between users accurately. The sequence might include a series of vowels, consonants, or numerical digits, each contributing to a diverse acoustic representation.

In an embodiment, the predetermined sequence of speech elements comprises a series of spoken numerals. Specifically, the series of spoken numerals includes numerals from 0 to 9. This leverages the numerical range from 0 to 9, which is strategically selected to maximize the diversity of vocal articulations involved in speaking each numeral. Numerals are particularly effective in this context because they involve a wide array of phonetic expressions that can effectively capture the range of voiced sounds from a user. This range includes variations in pitch, tone, and speed, which helps in distinguishing individual voice signatures. This use of a numerical sequence not only simplifies the user interaction with the voice authentication system 400 by providing a clear and universally understood set of speech elements but also enhances ability to generate a voice profile. Each numeral can invoke different aspects of vocal expression, thus providing a rich dataset for the voice authentication system 400 to analyze.

In other embodiments, the predetermined sequence of speech elements is not limited to numerals. The voice authentication system 400 can be configured to use other types of sequences that are equally effective in capturing a broad spectrum of voice characteristics. In an example, the predetermined sequence of speech elements include alphabetic sequences, such as sequence of letters or a combination of vowels and consonants that are designed to prompt distinct articulations and vocal patterns. In another example, the predetermined sequence of speech elements include phonetically balanced words, that are selected based on their phonetic diversity to ensure a wide coverage of the phoneme set used in a given language. In yet another example, the predetermined sequence of speech elements include common phrases or sentences, which can be used to capture more natural speech patterns and intonations, and are beneficial for systems designed to operate in conversational interfaces or more dynamic interaction environments. Each alternative option offers distinct advantages that can be leveraged depending on the specific requirements and operational context of the voice authentication system 400.

Further, upon receiving the voice data, the voice authentication system 400 proceeds to extract voice features from this data. The extraction process is designed to isolate and identify distinct characteristics of the voice data, focusing on aspects such as tonal, timbral, and temporal properties. Initially, the received voice data undergoes pre-processing to enhance the quality and clarity of the audio signal. This step may include noise reduction to eliminate background sounds and normalization to standardize the volume level across the recording. These adjustments ensure that the voice features extracted are as clear and distinct as possible. The system employs advanced signal processing techniques to extract a wide range of acoustic features from the pre-processed voice data. These features typically include pitch and tone, that are measurements of the fundamental frequency and its variability over time, capturing the high and low tones present in the user's voice; timbre, which involves examining the spectral distribution and energy content across various frequency bands; and temporal features such as speech rate, duration of pauses, and the rhythm of the speech, which reflect the behavioral aspect of the user's voice.

Figures 5, 6:
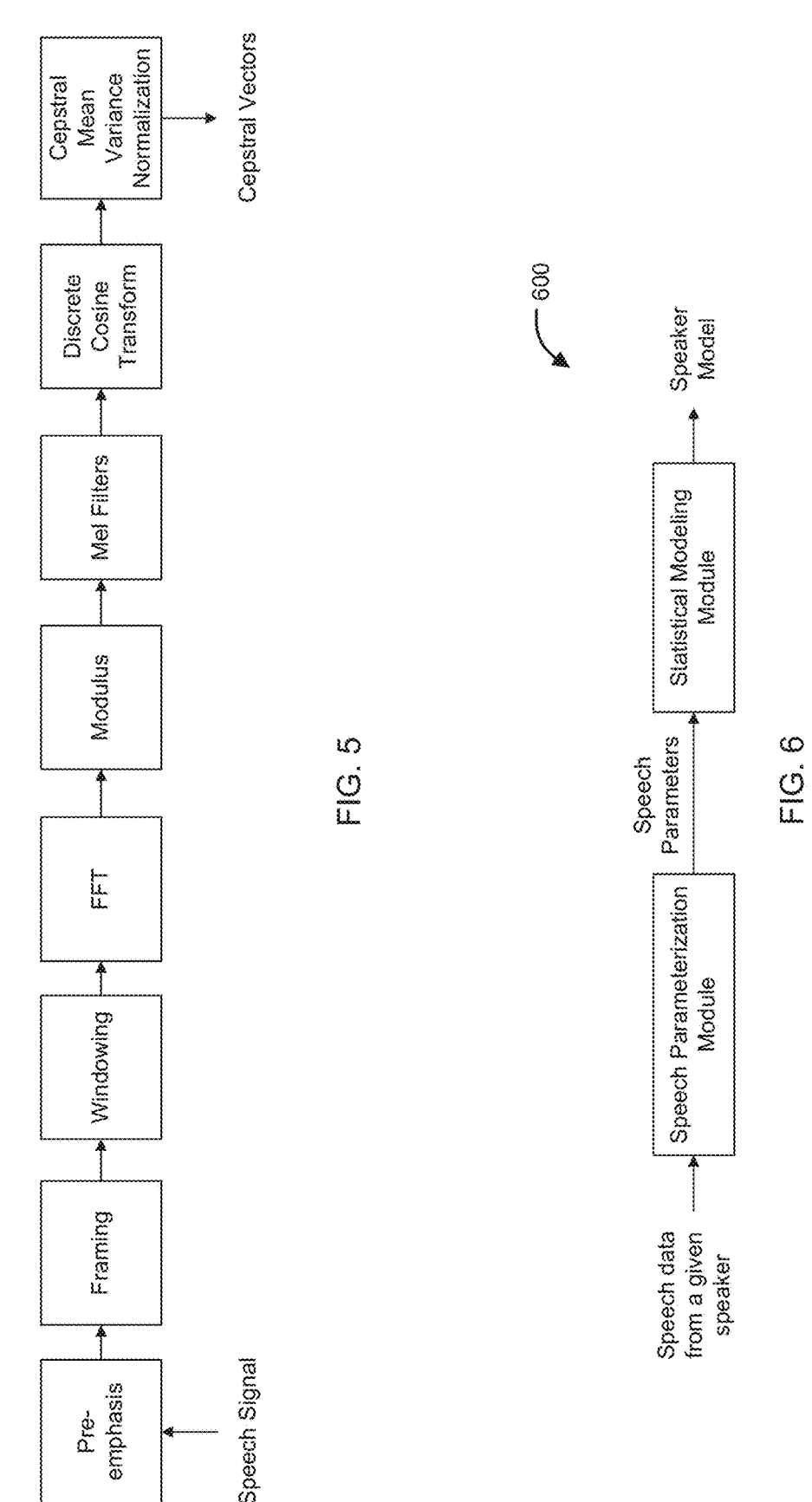
FIG. 5 illustrates a diagram of a process workflow for feature extraction from voice data, in accordance with one or more exemplary embodiments of the present disclosure.
FIG. 6 illustrates a diagram of a process workflow for statistical modelling of a user, in accordance with one or more exemplary embodiments of the present disclosure.

Referring to FIG. 5, illustrated is a diagram of a process workflow (as represented by reference numeral 500) for extraction of vectors (feature extraction) from voice data as performed by the voice authentication module 430. This process workflow 500 involves converting the raw speech signal into a more compact and representative format that is better suited for statistical modeling and analysis, such as in the voice authentication module 430. It does so by emulating the human auditory system's response to speech signals and extracting the most relevant features for distinguishing between different voices. Specifically, as illustrated, the process workflow 500 may include following steps:

Speech Signal (Input): This is the initial voice data that is collected from the user. This audio signal is typically captured through a microphone and then converted into a digital format, which can be analyzed and manipulated by digital signal processing techniques. The audio signal may be sampled at 8 kHz frequency, which is the standard for phone calls. Higher frequency ranges, like 16 kHz or 45 kHz, may also be supported.

Pre-emphasis: This initial step involves applying a pre-emphasis filter to the received voice data. Pre-emphasis increases the amplitude of high-frequency components relative to lower-frequency components. This is done because high-frequency elements of speech tend to have smaller amplitudes compared to low frequencies, and enhancing these can improve the reliability of subsequent signal processing steps.

Framing: The pre-emphasized signal is then split into short frames. This is because speech is a non-stationary signal, meaning its frequency characteristics change over time. By framing the signal into short, overlapping frames (usually between 20-40 ms in length), it may be assumed that the frequency content within each frame is stationary.

Windowing: Each frame is then windowed. This means that a window function, often a Hamming window or a Hanning window, is applied to each frame. Windowing minimizes the discontinuities at the frame boundaries, which can lead to spectral distortions when the Fourier transform is applied in the next step.

FFT (Fast Fourier Transform): The Fast Fourier Transform (FFT) is then applied to each windowed frame. This is a computationally efficient algorithm for computing the Discrete Fourier Transform, which converts the time-domain signal into the frequency domain. This reveals the spectral content of the frame, i.e. which frequencies are present and at what intensities.

Modulus: The modulus (or absolute value) of the Fourier transform output is taken to get a real-valued frequency domain representation of the signal.

Mel Filters: After converting to the frequency domain, a set of bandpass filters inspired by the human auditory system, such as Mel-scale filters, is applied. The Mel scale is a non-linear scale that is more closely aligned with human auditory response. These filters help in modeling how humans perceive sound, focusing on the parts of the signal that are most significant for human hearing. This step ensures that the extracted features are more representative of how voices are distinguished by human listeners.

Next, the process involves performing a decorrelation transform to derive Mel Frequency Cepstral Coefficients (MFCCs) as the voice features, which includes:

Discrete Cosine Transform (DCT): The Discrete Cosine Transform is then applied to the outputs of the Mel filters. The DCT helps to de-correlate the Mel filter outputs, which enhances the resulting feature vectors for further analysis.

Cepstral Mean Variance Normalization: In this step, the mean of the cepstral coefficients over a certain time period is subtracted from the cepstral coefficients (mean normalization), and then the result is divided by the standard deviation (variance normalization). This normalization process makes the MFCCs more robust against variations in signal amplitude and improves their overall discriminative capability.

Cepstral Vectors (Output): Finally, the output of this entire process is a set of cepstral vectors, also known as Mel Frequency Cepstral Coefficients (MFCCs). These are compact, low-dimensional feature vectors that effectively capture the relevant characteristics of the speech signal. These feature vectors are then used for further processing, such as voice recognition or voice authentication.

Referring back to FIG. 4, in the voice authentication system 400, the extracted features are then compiled into feature vectors. These vectors represent the voice data in a form that can be easily analyzed and compared by machine learning algorithms. Each vector includes information about the voice sample, reducing the complex audio data into a standardized format that highlights its most distinctive aspects. Depending on the sophistication of the system, additional advanced techniques such as Mel Frequency Cepstral Coefficients (MFCCs) or Linear Predictive Coding (LPC) may be used to capture more nuanced aspects of the voice. These techniques provide a compact representation of the voice signal and are highly effective in capturing the unique vocal traits needed for distinguishing between different users.

Following the feature extraction, the voice authentication system 400 derives a voice signature for the user based on the extracted voice features. This voice signature is a digital representation that captures the unique characteristics of the user's voice as identified from the extracted features. The voice signature specifically represents at least one of the tonal, timbral, and temporal characteristics of the user's voiced speech, making it a marker for user's identity. For this purpose, the extracted voice features, such as pitch (tonal), voice quality (timbral), and speaking rhythm (temporal), are aggregated into a profile. This profile includes detailed metrics and patterns identified in the user's voice data. Further, the voice authentication system 400 processes these aggregated data points to create a voice signature. This process typically involves statistical analysis and machine learning techniques to distill the complex data into a simplified yet highly descriptive representation of the user's voice. To ensure consistency and reliability in voice recognition, especially in varying acoustic environments, the voice signature is normalized and standardized. This step adjusts for any potential discrepancies caused by external factors like microphone quality or background noise, ensuring the voice signature remains stable and accurate across different situations. The voice signature is typically multi-dimensional, incorporating various aspects of the voice features. Each dimension corresponds to different voice characteristics, enhancing ability of the voice authentication system 400 to discriminate between users effectively.

In an embodiment, deriving the voice signature involves performing statistical modelling of the extracted voice features using a Gaussian Mixture Model (GMM). The Gaussian Mixture Model is a probabilistic model that assumes all the data points are generated from a mixture of a finite number of Gaussian distributions with unknown parameters. This model is particularly well-suited for modelling voice data due to its ability to handle variations in voice signals caused by different speaking environments, emotional states, and health conditions. When using a Gaussian Mixture Model in the context of voice authentication, the GMM represents the distribution of voice features across multiple dimensions, each corresponding to a specific characteristic of voice such as pitch, timbre, or tempo. The process begins by initializing the parameters of the Gaussian distributions, which involves setting means, variances, and mixture weights that reflect the assumed initial state of the voice features. The GMM then enters a training phase where these parameters are iteratively adjusted based on the input voice features. This training is typically conducted using the Expectation-Maximization (EM) algorithm, which alternates between assigning data points to the most likely Gaussian distribution (Expectation step) and updating the parameters of these distributions to maximize the likelihood of the data (Maximization step). The EM algorithm continues until the parameters converge or until a predefined number of iterations is reached. Once the Gaussian Mixture Model is adequately trained, it effectively captures the complex, multi-dimensional landscape of the voice features. Each component of the mixture model, or each Gaussian distribution, can be thought of as capturing a specific "state" or characteristic of the voice that occurs frequently across the sample data. The combination of these Gaussian components forms the voice signature that is highly representative of the user's vocal characteristics.

Once the voice signature is derived, the voice authentication system 400 stores this signature in a database (such as, the database 420). The storage of the voice signature allows the voice authentication system 400 to maintain a record of authenticated users, which is required for future verification processes and maintaining the integrity and security of the voice authentication system 400. In present embodiments, the database 420 may employ security measures, such as encryption, to ensure the secure storage and retrieval of unique voice signatures. To facilitate efficient data handling and meet the high-performance demands of real-time voice authentication, the voice authentication system 400 leverages a combination of relational and non-relational database management systems. Specifically, the voice authentication system 400 uses an industry-standard relational database management system (RDBMS) such as MySQL for structured data storage and management, along with a non-relational, document-oriented database like MongoDB for handling transient data during processing. MongoDB, with its flexible, high-performance, and scalable document data model, is utilized for the temporary storage of data in transit during the processing stage of the voice authentication system. It provides transactional support to data processing tasks, and its agile structure is well-suited to handle the dynamic data demands during authentication processing. Upon the completion of a transaction, the voice authentication system 400 activates a housekeeping function to transfer data from MongoDB to MySQL. The RDBMS triggers the process for storing historical data trails, transaction details, and other related information.

The MySQL database system, with its broad support for data durability and complex querying, is used to store more permanent, structured data. This includes information such as: (i) enterprise customer profile information, including details pertaining to each enterprise customer using the voice authentication system 400; (ii) enterprise hierarchy, including hierarchical structure and related data of the enterprise organization; (iii) end customer data attributes, including information attributes related to end customers or users of the voice authentication system; (iv) API interaction exchange history, including detailed history of API interactions that have occurred between the system and other entities; (v) links to the storage voice files, including references to the stored voice files, which may be in raw format or as extracted feature vectors.

In general, depending on the hosting environment of the voice authentication system 400, different instances of the databases are leveraged. When hosted on Amazon Web Services (AWS), the voice authentication system 400 utilizes the AWS Relational Database Service (RDS) instances. On the other hand, for deployments on the Google Cloud Platform, the voice authentication system 400 leverages the equivalent RDS instances provided by Google Cloud. In situations where the voice authentication system 400 is set up for on-premise deployments, the database system is set up on a standalone instance, usually in a virtual machine (VM) environment. This instance is made redundant to ensure high availability and reliability of the voice authentication system 400. To support real-time interaction and high-performance API demands, the databases are housed on high-performance Solid State Drive (SSD) storage systems, ensuring rapid data retrieval and efficient operation.

Separately, the voice authentication system 400 is also configured to receive a verification voice sample of the user. This sample involves the user enunciating a predetermined sub-set of speech elements that the voice authentication system 400 uses to verify the user's identity. As used herein, the "predetermined sub-set of speech elements" refers to a smaller or partial sequence of speech elements selected from the broader predetermined sequence. The sub-set is used during the verification process when the user is prompted to confirm their identity. This sub-set is also predetermined in that it is defined prior to the verification phase but is typically shorter or less complex than the full predetermined sequence. The purpose of using a sub-set is to streamline the verification process, requiring the user to provide only a portion of the full sequence for quicker yet still secure authentication. The sub-set is chosen to represent aspects of the user's voice profile that are sufficient for comparison against the stored voice signature.

Herein, the user interacts with the voice authentication system 400 by responding to prompts that require them to speak aloud specific speech elements. These elements are part of a predetermined sub-set carefully chosen to elicit the range of voice features necessary for verification. This sub-set may include numbers, words, or phonetic sequences that the user had previously recorded, ensuring consistency with the stored voice signature. The voice authentication system 400, via the user device 300, uses a microphone or an array of microphones to capture the user's vocalizations. In some examples, the received voice sample undergoes pre-processing to standardize the audio quality. This may involve noise reduction, normalization of volume levels, and filtering out unnecessary frequencies. Such pre-processing helps in reducing the impact of any ambient noise or variations in speech delivery, which might otherwise affect the authenticity of the voice sample.

In the present configuration, the predetermined sub-set of speech elements (preferably numerals), which the user must enunciate, can be delivered through various methods including SMS (Short Message Service), OTP (One-Time Password), or an authenticator application. The choice of delivery method is influenced by considerations of accessibility, security, and user convenience. SMS is widely accessible and straightforward, allowing the sequence to be received on any mobile device that supports text messaging. OTPs enhance security by ensuring that the sequence is valid only for a short period and a single authentication attempt, thereby reducing the risk of unauthorized use. Authenticator applications provide a dynamic and secure way to generate and display sequences, further strengthening the security framework. The sequence of numbers itself can either be random or predefined. Random sequences are preferred for their ability to enhance security by preventing replay attacks and reducing predictability, making it difficult for unauthorized users to guess the sequence. In contrast, predefined sequences may be employed in environments where user familiarity with the sequence can help reduce errors and case the authentication process. Additionally, the length of the sequence is considered to ensure that the user speaks for a minimum required duration. This duration is considered as it guarantees that sufficient voice data is collected, enabling an analysis necessary for accurate verification. The combination of these delivery methods and the characteristics of the sequence are designed to optimize the balance between user convenience and the need for secure, reliable data collection in voice authentication.

Further, in the voice authentication system 400, the verification sample is compared with the stored voice signature in the database 420. For this purpose, initially, the voice authentication system 400 extracts voice features from the received verification sample, focusing on the tonal, timbral, and temporal characteristics that define the user's vocal pattern. This extraction is similar to the process used during the initial creation of the voice signature to ensure consistency in the features being analyzed. Simultaneously, the voice authentication system 400 retrieves the stored voice signature from its database 420. This signature, which was derived from previous interactions with the user, serves as the reference model for comparison. The voice authentication system 400 then assesses the similarity between the voice features of the new sample and those encapsulated in the stored signature. These algorithms evaluate various voice data aspects, including pitch patterns, speech rhythm, and spectral qualities, to compute a match score. Such match score quantifies how closely the new voice sample matches the stored voice signature and is compared against predefined thresholds that have been established to balance security and usability. If the match score surpasses a certain threshold, the voice authentication system 400 authenticates the user, confirming that the voice sample matches the historical voice data associated with the user's identity. Conversely, if the score falls below this threshold, the authentication attempt is rejected.

More specifically, in the voice authentication system 400, the process of comparing the verification voice sample involves a series of methodical steps designed to ensure precise user authentication. First, the voice authentication system 400 extracts voice features from the verification voice sample. This step involves analyzing the sample to identify and isolate key vocal attributes such as pitch, timbre, and rhythm, for accurate voice recognition. Once these features are extracted, the voice authentication system 400 proceeds to compare them against the stored voice signature of the user. This stored signature contains the unique vocal characteristics previously identified and saved during the user's registration or previous verification sessions. Simultaneously, the extracted features are also compared against a universal background model. This model represents average voice characteristics derived from a broader population. The purpose of this dual comparison is to refine the accuracy of the voice authentication process by distinguishing the individual's unique vocal features from common vocal patterns found in the general population. Following the comparison, the voice authentication system 400 calculates a match score. This score quantifies the degree of similarity between the voice features of the verification sample and the stored voice signature, as well as how distinct these features are from those captured in the universal background model.

The voice authentication system 400, then, authenticates the user based on the comparison. This final step of the verification process involves authenticating the user based on the match score derived from the comparison of the verification voice sample with the stored voice signature and the universal background model. As discussed, the match score quantifies the level of similarity between the extracted voice features from the current sample and the features encapsulated in the user's voice signature. The voice authentication system 400 is configured to authenticate the user if the match score exceeds a predetermined threshold. This threshold is set based on empirical data and security requirements to optimize the balance between false acceptances (authenticating an unauthorized user) and false rejections (failing to authenticate an authorized user). By setting this threshold, the voice authentication system 400 ensures that only users whose voice samples closely match their stored profiles are granted access, thereby enhancing security. When the match score meets or surpasses this threshold, the voice authentication system 400 concludes that the voice sample is sufficiently similar to the stored signature and thus authenticates the user.

In some embodiments of the voice authentication system 400, an additional layer of security is implemented by measuring the response timing of the user as they enunciate a predetermined sub-set of speech elements. This process begins with the voice authentication system 400 capturing the time it takes for the user to respond after being prompted to speak. The voice authentication system 400 then evaluates whether this response timing exceeds a predetermined threshold, which is set based on expected norms for response times under normal conditions. If the response timing does exceed this predetermined threshold, indicating potential issues such as an attempt to use a recorded voice or hesitation that could signal fraud, the voice authentication system 400 takes proactive measures by re-prompting the user. The user is asked to enunciate the same sub-set of speech elements once more, providing them with another opportunity to respond within the normal expected timeframe. In case the user's response time exceeds the threshold again after a predefined number of re-prompts, the voice authentication system 400 interprets this pattern as a potential security risk. Consequently, the voice authentication system 400 fails the authentication attempt, denying access to the user. This measure prevents unauthorized access through manipulation or deception, thereby enhancing the overall security framework of the voice authentication system 400. This approach ensures that only users who can consistently respond in a timely manner, indicative of live and direct interaction, are authenticated, which is vital for maintaining the integrity and reliability of the system.

Referring to FIG. 6, illustrated is a diagram of a process workflow (as represented by reference numeral 600) for statistical modelling of a speaker (user) as performed by the voice authentication module 430. This process workflow 600 of statistical modeling for a speaker involves converting raw speech data into a compact and effective set of parameters, and then using these parameters to construct a statistical model that captures the unique characteristics of the speaker's voice. The model can then be used for speaker verification tasks, helping to determine whether a given speech sample was spoken by a particular speaker. Specifically, as illustrated, the process workflow 600 may include following steps:

Speech data from a given speaker: The process workflow 600 begins with collecting speech data from the speaker who is to be modeled. This data serves as the foundation of the voice authentication module 430. The speech data may be collected over a period of time or in one instance and should be representative of the speaker's normal vocal characteristics. The choice of what the speaker says during this recording can have a significant impact on the accuracy of the model. In embodiments of the present disclosure, enunciating numbers can be particularly effective because of the rich voice data they generate.

Speech parameterization: Once the speech data from a given speaker is received, the process workflow 600 then performs speech parameterization. This step converts the raw speech data into a set of parameters or features that succinctly capture the unique aspects of the speaker's voice. As discussed, one effective method of speech parameterization involves extracting Mel Frequency Cepstral Coefficients (MFCCs) from the speech signal. This technique involves several steps including pre-emphasis, framing, windowing, FFT, modulus calculation, Mel filter application, Discrete Cosine Transform (DCT), and Cepstral Mean Variance Normalization.

Speech parameters: The result of the speech parameterization step is a set of MFCC vectors for each speech frame, which serve as a compact and effective representation of the speaker's voice characteristics. These parameters can be used against noise and variations in pitch and amplitude, making them an ideal choice for speaker modeling.

Statistical modeling: This step involves the process workflow 600 to generate a statistical model of the speaker's voice using the speech parameters. This model serves as a quantified representation of the speaker's unique vocal characteristics, based on the extracted speech parameters. In an example, the statistical modeling in speaker verification involves the use of Gaussian Mixture Models (GMMs). GMMs work by fitting a mixture of Gaussian distributions to the input data, with each Gaussian component representing a different 'cluster' or 'group' of data points. The MFCC vectors generated in the previous step are used as input to the GMM. The GMM effectively models the distribution of these vectors for the given speaker, thereby capturing the unique characteristics of the speaker's voice. In some examples, before statistical modeling, the non-speech or silent segments may be removed from the speech signals based on Gaussian parameters. This ensures that the statistical modeling is focused on the relevant, speech-containing segments, thereby improving the accuracy and effectiveness of the speaker model.

Speaker model: Once the GMM has been trained, it forms a model for the speaker's voice, which can be used for speaker verification. When a new speech sample is encountered, its MFCCs can be compared to the GMM for a hypothesized speaker. If the new MFCCs fit well with the speaker's GMM (i.e., they have a high likelihood under the GMM), this provides evidence that the speech was indeed spoken by the hypothesized speaker.

Figure 7:
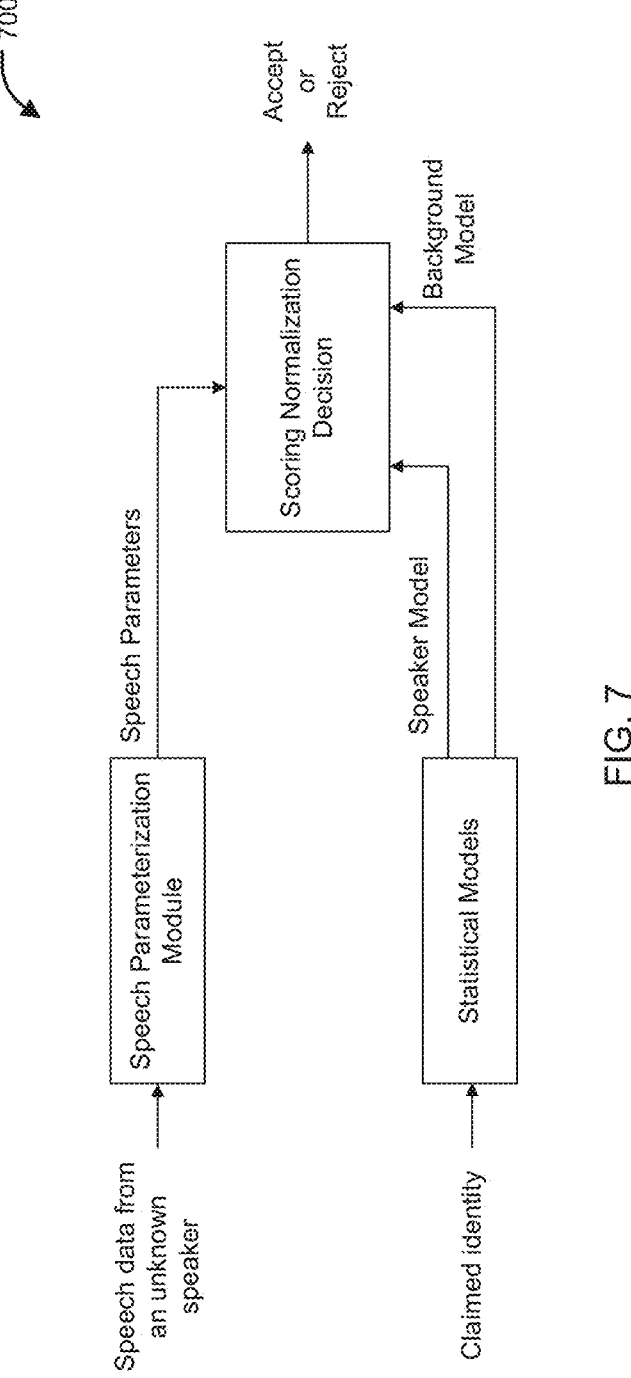
FIG. 7 illustrates a diagram of a process workflow for user verification, in accordance with one or more exemplary embodiments of the present disclosure.

Referring to FIG. 7, illustrated is a diagram of a process workflow (as represented by reference numeral 700) for speaker verification as performed by the voice authentication module 430. This process workflow 700 of speaker verification involves extracting features from the speech data of an unknown speaker, and comparing these features against a speaker-specific model and a universal background model. The outcome of this comparison is used to determine whether the unknown speaker's voice matches the claimed identity. Specifically, as illustrated, the process workflow 700 may involve two primary sub-processes: feature extraction from the unknown speech data, and matching this extracted feature against known speaker models. Each of these sub-processes is further broken down into steps. Specifically, the sub-process of feature extraction uses speech data from an unknown speaker as input. This could be a voice clip recorded for the purpose of voice authentication. The speech data is typically a short utterance of specified numbers as this provides a set of voice data points for comparison. Further, the speech data from the unknown speaker undergoes the same process of speech parameterization as described in the speaker modelling section. This process converts the raw speech data into a set of MFCCs which succinctly capture the unique aspects of the speaker's voice. This results in a set of parameters, or features, which represent the unique vocal characteristics of the unknown speaker. Further, the sub-process of comparison against known speaker models uses the claimed identity of the speaker as the input. Herein, the voice authentication module 430 retrieves the corresponding statistical speaker model for the claimed identity from the database 420 of stored speaker models. Simultaneously, a universal background model (UBM) representing the distribution of acoustic features of all speakers is also retrieved. The UBM, trained using large amounts of data, serves as a benchmark against which the unknown speaker's features are compared. It is a speaker-independent model, representing the 'average' voice characteristics across all speakers. The UBM essentially captures the 'background' characteristics of human voices, against which individual speaker models can stand out. The final step in the process workflow 700 involves scoring and normalization to determine if the voice sample from the unknown speaker matches the claimed identity. The MFCCs extracted from the unknown speaker's speech data are compared with both the speaker model and the UBM. A score is computed, representing how well the unknown speaker's features match the speaker model as compared to the UBM. A typical scoring mechanism might involve calculating the log-likelihood ratio between the speaker model and the UBM for the unknown speaker's MFCCs. This score essentially measures how much 'more likely' it is that the unknown speaker's MFCCs were generated by the speaker model, as opposed to the UBM. The final decision to accept or reject the claim of the speaker's identity is based on this score. If the score exceeds a certain threshold, the system concludes that the unknown speaker's voice matches the claimed identity, and the speaker is verified. If the score is below this threshold, the speaker is not verified.

It may be appreciated that the present disclosure provides a comprehensive voice biometric-based solution utilizing speech elements, such as numerical sequences spoken in any language (not necessarily in English). By capturing the unique vocal characteristics of users as they enunciate numbers, the system 400 accurately identifies and authenticates individuals based solely on their voice features. Also, the predetermined sequence of speech elements (or numbers) may not necessarily follow a sequential order like 0, 1, 2, . . . , 8, 9, but can be arranged in any sequence. The requirement is that the chosen sequence captures the comprehensive range of voiced sounds produced by the user. This flexibility ensures that the voice biometric system effectively captures the diverse vocal characteristics necessary for accurate and reliable user authentication. Further, no conversion of speech to text is required for implementation of the present system 400, as the system 400 directly analyzes the raw voice data to extract relevant features for authentication. This approach simplifies the process, enhances security, and improves the efficiency of voice biometric verification by eliminating the intermediate step of converting spoken language into text.

Through these configurations, the voice authentication system 400 provides a secure and efficient mechanism for verifying the identity of users based on unique voice characteristics. By leveraging a detailed process of receiving, analyzing, and comparing voice data, the voice authentication system 400 ensures that only authorized users are authenticated, enhancing the security of the environments in which it is deployed.

In embodiments of the present disclosure, the voice authentication system 400 is configured to provide voice authentication services to third-party systems via an application programming interface (API). The architecture of the voice authentication system 400 is designed to be modular, supporting scalability and flexibility in deployment. The system can be integrated into various third-party applications through an API, allowing for the extension of voice authentication services across different platforms and environments. This integration capability enables a wide range of applications, from secure access systems to user verification in digital payment platforms. For instance, by providing a standardized interface, the API facilitates easy integration into existing IT infrastructures. This means that businesses can incorporate voice authentication features into their systems with minimal changes to their current setups. For this purpose, the API allows third-party systems to send voice data to the voice authentication system 400 securely and receive authentication results in real-time. This interaction includes transmitting voice samples from user devices via third-party applications to the server 200 for processing. The server 200 processes the received voice data, applies feature extraction, and performs authentication checks by comparing the data against pre-stored voice signatures in its database 420. The results of this comparison (whether the user is authenticated or not) are then sent back to the third-party system through the API.

In particular, the voice authentication system 400 of the present disclosure interacts with third-party entities through a specific set of application programming interfaces (APIs), for providing voice authentication service. This set of APIs is primarily designed to manage and control access to services of the system by third-party entities, such as enterprise customers who want to integrate the provided voice authentication capabilities with their own customer relationship management (CRM) systems. Recognizing the needs of customers who have existing business flows and prefer to use their own CRM systems, the voice authentication system 400 offers the API set which provides an asset-light RESTful (Representational State Transfer) interface, enabling integration of the voice authentication system 400 with existing business infrastructures. Due to its straightforward design, the integration of the API set with enterprise systems typically requires minimal effort. The API set utilizes a single API interface which accommodates all functions, such as user registration and voice authentication (verification). This design simplifies interaction of the voice authentication system 400 with third-party applications and promotes consistency in the interface.

Moreover, the API set adheres to a Zero Trust security model. This means that all transactions using the API undergo multiple levels of authentication to ensure the security and integrity of the exchanged data. These layers of authentication include:

1. Enterprise ID: Self-generated by the enterprise client using the voice authentication system 400.
2. Enterprise Credentials: These are user/secret keys that are self-generated by the enterprise.
3. Domain Validation: This process verifies the enterprise's domain ownership.
4. IP Validation: This involves white-listing the source IP addresses allowed to interact with the voice authentication system 400.
5. Encryption: All data exchanged between the endpoints are encrypted, ensuring data confidentiality and integrity.

The present voice authentication system 400 also focuses on data privacy. The customer data exposure to the system is kept to a minimum, allowing the enterprise clients to maintain control over their customer data. If required, the voice authentication system 400 can operate as a purely stateless processing platform, wherein it does not store any data within its infrastructure. This flexibility accommodates different data handling policies and preferences of the enterprise clients, thereby strengthening data privacy and control.

In an embodiment of the present disclosure, the voice authentication system 400 is implemented as an AI-driven voice biometric authentication unit which adopts a microservices-based architectural model. Such microservices-based architecture includes a plurality of independent modules for performing different tasks in the voice authentication process. This model offers high levels of modularity, scalability, and efficiency, and aligns with the requirements of the voice authentication system 400 for processing large volumes of data in real-time and across multiple channels. Such microservices architecture allows the voice authentication system 400 to be broken down into a series of interlinked components or microservices, each fulfilling a specific role in the voice authentication process. This approach promotes a more manageable and flexible system design, enabling each component to be developed, updated, scaled, and monitored independently. These components communicate with each other via well-defined APIs and protocols, thereby maintaining a high level of cohesion and a low degree of coupling.

Herein, specifically, access to the present voice authentication system 400 for voice authentication can be accomplished through several flexible methods. The following details the ways end users can access the voice authentication system 400.

(i) Web Link Access: Web link access provides a powerful and straightforward method to carry out the registration and verification processes. This method is efficient, requiring no software installation or specific device. A short-lived web link can be sent from a customer relationship management (CRM) system via email, SMS, or other messaging platforms like WhatsApp, and can be opened on any device. The user interface is designed to be intuitive and user-friendly, free from technical jargon. In order to facilitate integration with other web applications, the source code package of the voice authentication system 400 may be made available to partners and customers. This enables an asset-light integration process. The software for this interface is developed using ReactJS.

(ii) SMS (Short Lived Link): Similar to the PC web link method, a short-lived web link can also be sent to an end user via an SMS. This link can be accessed on both PC and mobile browsers. All details explained above for PC web link are applicable to SMS web link.

(iii) WhatsApp Integration: Given the widespread use of WhatsApp, even for government mandated applications, the system offers a secure registration and verification process via a WhatsApp Chatbot.

(iv) Mobile Apps: The voice authentication system 400 may also provide a mobile app that can be used by customers and partners. The mobile app utilizes the same system APIs (Application Programming Interfaces) used by components of the voice authentication system 400, enabling easy and quick external integrations. The voice authentication system 400 may also provide the source code of its mobile and web apps to its customers and partners. This enables them to integrate the capabilities of the voice authentication system 400 into their own enterprise mobile apps. At the heart of these mobile and web apps is the voice recorder, a key feature that customers' IT teams can leverage without having to search and experiment with multiple recorders.

(v) Web/Mobile SDK Kit: The system may also employ a Mobile Web Software Development Kit (SDK), designed as a ready-to-use plug-in module for third-party apps. The integration of this SDK can be performed by the customer or partners in their apps, requiring minimal effort. This ensures that the voice authentication system 400 is able to provide easy integration of its voice authentication services into various platforms.

Referring now to FIG. 8, the present disclosure further provides a computer-implemented method (as represented by a flowchart, referred by reference numeral 800) for authenticating a user by voice in a voice authentication system 400. The method 800 includes a series of steps. These steps are only illustrative, and other alternatives may be considered where one or more steps are added, one or more steps are removed, or one or more steps are provided in a different sequence without departing from the scope of the present disclosure. Various variants disclosed above, with respect to the aforementioned system 400 apply mutatis mutandis to the present method 800 without any limitations.

At step 802, the method 800 includes receiving, by the server 200 comprising one or more processors, voice data of a user enunciating a predetermined sequence of speech elements, wherein the predetermined sequence of speech elements is configured to capture a defined range of voiced sounds produced by the user. Herein, the server 200 initiates the authentication process by receiving voice data from a user via the user device 300. This voice data is collected as the user enunciates a predetermined sequence of speech elements. This sequence is specifically configured to capture a wide range of voiced sounds that the user produces, ensuring that diverse vocal characteristics are included. The selection of these speech elements is strategic, designed to extract vocal attributes such as pitch, tone, and rhythm, which are required for creating a detailed voice profile.

At step 804, the method 800 includes extracting, by the server 200, voice features from the received voice data. That is, upon receiving the voice data, the server 200 proceeds to extract distinctive voice features from it. This extraction focuses on identifying and isolating key aspects of the voice data, such as tonal, timbral, and temporal characteristics. These features are important as they represent the unique vocal signature of the user, which will be used to verify their identity.

At step 806, the method 800 includes deriving, by the server 200, a voice signature for the user based on the extracted voice features, wherein the voice signature is representative of at least one of tonal, timbral, and temporal characteristics of the user's voiced speech. That is, using the extracted voice features, the server 200 then derives a voice signature for the user. This voice signature is a digital representation of the user's unique vocal characteristics, encapsulating the essential elements of their voice that distinguish them from others. This signature serves as the baseline for future authentication attempts, providing a reliable reference that captures the user's unique vocal traits.

At step 808, the method 800 includes storing, by the server 200, the derived voice signature in the database 420. That is, once the voice signature is derived, it is stored in the database 420 maintained by the server 200. This database 420 acts as a secure repository for the voice signatures of all registered users, enabling quick retrieval for comparison during subsequent authentication attempts.

At step 810, the method 800 includes receiving, by the server 200, a verification voice sample of the user enunciating a predetermined sub-set of speech elements. Herein, for verification purposes, the server 200 later receives another sample of voice data from the user. This time, the user enunciates a predetermined sub-set of speech elements, which are part of the initial sequence but may require less effort to produce. This sub-set is used to verify the user's identity against the stored voice signature.

At step 812, the method 800 includes comparing, by the server 200, the verification voice sample with the stored voice signature. Herein, the server 200 compares the newly received verification voice sample with the previously stored voice signature. This comparison determines whether the voice sample provided during the verification matches the signature on file, indicating that the voice belongs to the registered user.

At step 814, the method 800 includes authenticating, by the server 200, the user based on the comparison. That is, based on the outcome of the comparison, the server 200 authenticates the user. If the verification voice sample closely matches the stored voice signature, and the match score exceeds a predetermined threshold, the user is authenticated, confirming their identity and granting them access to the system or service.

In one or more embodiments, the predetermined sequence of speech elements comprises a series of spoken numerals. This choice of numerals as speech elements leverages the distinct vocal patterns elicited by their enunciation, which are highly effective in capturing a range of voice characteristics. Using numerals ensures that the sequence is simple to understand and execute by users, while providing data for the extraction of voice features necessary for accurate voice signature creation. In one or more embodiments, the series of spoken numerals includes numerals from 0 to 9. This range is strategically selected to cover a broad spectrum of phonetic diversity, which assists in effectively capturing the nuances of voice across different pitches and modulations. Each numeral in the sequence can provoke different vocal responses, thereby enriching the voice data collected. This comprehensive collection of voice data allows the system to create a detailed and reliable voice signature that enhances the accuracy and security of the voice authentication process.

In one or more embodiments, the method 800 further includes: pre-emphasizing, by the server 200, the received voice data; framing, by the server 200, the pre-emphasized voice data into overlapping time frames; applying, by the server 200, a window function to each time frame to reduce boundary discontinuities; performing, by the server 200, a Fourier transform on each windowed time frame to convert to a frequency domain representation; applying, by the server 200, a set of bandpass filters modelling human auditory perception to the frequency domain representation; and performing, by the server 200, a decorrelation transform to derive Mel Frequency Cepstral Coefficients (MFCCs) as the voice features. The first step in this process is pre-emphasizing the received voice data. This involves amplifying the higher frequencies of the voice data, which tend to be weaker in amplitude compared to lower frequencies. Pre-emphasis helps in enhancing the clarity of the speech signal, particularly the consonant sounds that are used for distinguishing between different spoken words and sounds. Following pre-emphasis, the server 200 frames the pre-emphasized voice data into overlapping time frames. By breaking the continuous speech signal into small, manageable segments, typically lasting 20-30 milliseconds each, the system can treat the quasi-stationary signal within each frame more effectively. Overlapping these frames ensures that no data is lost at the boundaries of each frame, which is required for maintaining the continuity and integrity of the speech signal. Next, the server 200 applies a window function to each of these framed segments. The window function, such as a Hamming or Hanning window, is used to taper the signal at the beginning and end of each frame to minimize boundary discontinuities and spectral leakage. This step is essential for preparing the signal for accurate spectral analysis. The server 200 then performs a Fourier transform on each windowed time frame. This transform converts the time-domain representation of each frame into a frequency domain representation. The Fourier transform is fundamental in revealing the spectral components of the speech signal, allowing for a detailed analysis of its frequency content. After the Fourier transformation, the server 200 applies a set of bandpass filters that model human auditory perception, known as Mel filters. These filters are designed to mimic the non-linear human ear perception of sound, emphasizing the frequencies to which the human ear is most sensitive. This step ensures that the extracted features are more representative of how humans actually perceive speech sounds. Finally, the server 200 performs a decorrelation transform to derive Mel Frequency Cepstral Coefficients (MFCCs) from the filtered frequency domain representation. The decorrelation transform, typically a Discrete Cosine Transform (DCT), helps to compact the signal information into fewer coefficients, making MFCCs highly effective for voice recognition. MFCCs represent the short-term power spectrum of the sound and are widely used in voice and speech analysis because of their ability to capture both the phonetic and prosodic characteristics of the spoken audio.

In one or more embodiments, the method 800 further includes performing, by the server 200, statistical modelling of the extracted voice features using a Gaussian Mixture Model (GMM). The Gaussian Mixture Model is particularly well-suited for voice data as it provides a flexible approach to modelling the distributions of voice features, which are often multimodal (having multiple peaks in their distribution). The GMM assumes that the features extracted from the voice data can be modeled as a mixture of multiple Gaussian distributions, each representing different statistical properties of the voice features.

In one or more embodiments, the method 800 further includes extracting, by the server 200, voice features from the verification voice sample; comparing, by the server 200, the extracted voice features against the stored voice signature and a universal background model representing average voice characteristics; and determining, by the server 200, a match score based on the comparison. During this comparison process, the server 200 evaluates the similarity between the extracted voice features and the stored voice signature, as well as the dissimilarity from the universal background model. This dual comparison enhances the accuracy of the authentication by ensuring that the verification sample closely matches the user's unique voice profile while differing from average population characteristics. The match score quantifies the degree of similarity between the verification voice sample and the stored voice signature, accounting for how distinct these features are from the universal background model. If the match score exceeds a predetermined threshold, the server 200 authenticates the user, confirming their identity.

In one or more embodiments, the method 800 further includes authenticating, by the server 200, the user when the match score exceeds a predetermined threshold. The match score, determined in the previous step, quantifies the degree of similarity between the extracted voice features from the verification sample and the stored voice signature. This score is evaluated against a predefined threshold, which is set to balance the security and usability requirements of the system. If the match score meets or exceeds this threshold, it indicates a high likelihood that the verification sample matches the stored voice signature of the user. Upon exceeding the threshold, the server 200 proceeds to authenticate the user.

In one or more embodiments, the method 800 further includes measuring, by the server 200, a response timing of the user enunciating the predetermined sub-set of speech elements; determining, by the server 200, whether the response timing exceeds a predetermined threshold; re-prompting, by the server 200, the user to enunciate the predetermined sub-set of speech elements again if response timing exceeds the predetermined threshold; and failing, by the server 200, the authentication of the user if the response timing exceeds the predetermined threshold after a predefined number of re-prompts. The server 200 continues to measure the response timing for each subsequent attempt. If the response timing exceeds the predetermined threshold after a predefined number of re-prompts, the server 200 fails the authentication of the user. This means that the system denies access, as the repeated delays in response timing could indicate potential issues such as the use of pre-recorded voice samples or other fraudulent activities.

In one or more embodiments, the method 800 further includes providing, by the server 200, voice authentication services to third-party systems via an application programming interface (API). The API facilitates secure communication between the voice authentication system and third-party systems, enabling these systems to send voice data to the server 200, receive authentication results, and integrate voice authentication into their own processes. This service-oriented approach broadens the applicability of the voice authentication system 400, making it a versatile tool for enhancing security across various platforms and applications.

In one or more embodiments, the method 800 further includes implementing, by the server 200, a microservices-based architecture for the voice authentication system, the microservices-based architecture comprising a plurality of independent modules for performing different tasks in the voice authentication process. This architecture comprises a plurality of independent modules, each responsible for performing different tasks in the voice authentication process. For example, one module may handle the extraction of voice features, another module may perform the statistical modelling, and yet another module may manage the comparison and authentication steps. This modular approach allows for greater scalability, flexibility, and maintainability of the system. By decoupling the various functions into discrete services, the system can efficiently allocate resources, update individual components without affecting the entire system, and ensure required performance and reliability in processing voice authentication tasks.

According to embodiments of the present disclosure, the voice authentication system 400 may be implemented for number-based voice authentication. This process begins with user interaction, which is facilitated by a web link, SMS, or via WhatsApp integration, as discussed previously. For instance, an enterprise customer can use the APIs of the voice authentication system 400 to generate a short-lived web link which they send to the user via SMS or email. For the registration phase, once the user opens the provided web link on a device of their choosing, whether a personal computer or a mobile phone, the voice authentication system 400 instructs the user to enunciate each digit from zero through nine (0-9). This ensures that a comprehensive voice sample of all numerals as enunciated by the user is captured. Upon completion of the voice sample collection, the samples are processed by the voice authentication system 400 that derives a unique voice signature from the voice samples. This voice signature is based on the tonal, timbral, and temporal characteristics of the user's spoken digits. Following the extraction of the unique voice signature, the voice authentication system 400 securely stores the voice signature model within the database 420. During the verification phase, the voice authentication system 400 presents the user with a unique string of digits. The delivery of these digits can be accomplished through several means such as SMS, email or other communication channels. Upon receiving the string of digits, the user is prompted to pronounce them. The voice authentication system 400 compares this verification voice sample against the stored unique voice signature. If a match is found, the voice authentication system 400 authenticates the user's identity, thereby completing the voice authentication process.

Such implementation of the voice authentication system 400 resolves the problem of lower accuracy levels in voice authentication, which often limits its use in secure transactions. Herein, the voice sample generated in this process is captured by the voice authentication system 400 and serves as the verification voice sample. The voice data collected may need to be of a certain duration; specifically, at least 14 seconds for registration and a minimum of 7 seconds for verification. The voice authentication system 400 advances voice authentication to deliver higher accuracy levels, exceeding the industry average of 90%-92% to reach >99.9%. The voice authentication system 400 is effective irrespective of the language, accent, or dialect of the user, as it hinges on the vocal cord usage in pronouncing numbers.

In an implementation, the voice authentication system 400 can be used to enable users to log into applications or computers using their voice as the sole means of authentication. The user is prompted to speak a predetermined sequence of speech elements into their device. The system processes this voice data to extract voice features and compare these against the stored voice signature in the database 420. If the match score exceeds the predetermined threshold, access is granted to the user. This method removes the need for traditional passwords or physical security measures and operates effectively across any geographical location, as long as a phone call connection is possible. This universal accessibility ensures that users can securely access their accounts from anywhere without the need for typing or remembering complex passwords.

In call centers, the voice authentication system 400 can also be used to automatically identify callers without requiring them to manually provide their identification details. When a call is received, the system prompts the caller to enunciate a predetermined sub-set of speech elements. The system 400 captures this voice data, extracts relevant features, and compares them to voice signatures stored in its database 420. If the voice data matches a stored signature, the caller's identity is confirmed, and the call can proceed with personalized handling based on the caller's identified profile. This process streamlines customer service operations by reducing the need for callers to undergo lengthy identification procedures and minimizes the risk of incorrect or fraudulent identification.

The voice authentication system 400 can further be utilized to authenticate or verify the attendance of staff working in the field, along with the GPS technology or the like. Field staff members initiate the authentication process via a mobile device by enunciating a predetermined sequence of speech elements. The voice data is transmitted to the server where it is processed to extract voice features and compare these with stored voice signatures. Successful authentication is recorded as attendance. This application of the system ensures that staff attendance is logged accurately and securely, providing a reliable method of managing remote or field-based workforces without the need for physical attendance systems.

The voice authentication system 400 can also facilitate secure bank-to-bank transfers by allowing users to authenticate digital payment transactions through natural language voice commands. In this scenario, a user initiates a payment transaction by speaking a command along with the transaction details, such as the amount and the recipient. The system processes this voice data to extract voice features and compare them with the stored voice signature of the user. Given the high accuracy rate of 99.9%, it ensures that the voice command is indeed from the registered user before proceeding to authorize the transaction. This application not only enhances security by verifying the identity of the transaction initiator but also adds convenience by integrating natural language processing, allowing users to conduct secure transactions without manual authentication steps.

For national defense, the voice authentication system 400 can act as a silent listener within communication systems used by defense personnel. When members of a group engage in a secure conversation, the system continuously monitors the conversation to ensure that only authorized personnel are participating. If an unapproved individual, such as an enemy intercepting the communication, begins to speak, the system immediately identifies the unauthorized voice characteristics and flags the intrusion. This capability is needed for maintaining the security of communications in sensitive environments, providing real-time surveillance and response to potential security breaches.

For first responders, the voice authentication system 400 can serve as a tool for verifying identities during communications between personnel in the field and their central offices. When a first responder initiates communication, the system quickly processes the voice data to confirm the responder's identity through their unique voice signature. This secure authentication process ensures that the communication lines are secure and that the information shared during emergency situations is exchanged only between verified personnel. This implementation not only bolsters the security of sensitive operational communications but also enhances the efficiency and reliability of the response efforts by ensuring that all communications are authentic.

In legal and authorized environments, the voice authentication system 400 can be used to ensure that only legitimate participants engage in phone conversations. This is particularly useful in scenarios where security and confidentiality are paramount, such as in legal consultations or sensitive business discussions. The system 400 analyzes voice data from participants in real-time, comparing it against stored voice signatures in its database 420. If a participant's voice does not match any authorized voice signature, the system flags this anomaly, indicating a potential rogue member. This feature ensures that all parties in a conversation are verified, thereby safeguarding against unauthorized access and information leakage.

The voice authentication system 400 can also provide a defense mechanism against the voice cloning and deepfake technology. It is capable of distinguishing between genuine human voices and those synthesized by AI-based generative solutions. The system 400 analyzes the subtle nuances and complexities of speech patterns that are often missing in synthetic voices. By comparing these characteristics against known human voice features stored in its database 420, the system can identify discrepancies that suggest a voice may be a deepfake. This capability maintains the integrity of communications in various fields, including media, politics, and security, where the authenticity of voice data is important.

In the context of customer service, the voice authentication system 400 can also be used to enhance the personalization of loyalty programs. When callers interact with service platforms, such as over the phone or via kiosks, the system identifies them through their voice signatures. Upon verification, the system accesses the individual's preferences and history associated with the loyalty program to tailor services and offers directly to them. This application not only streamlines the customer experience, making it more engaging and personalized but also fosters customer loyalty by making interactions smoother and more rewarding.

The voice authentication system 400 can further be used to authenticate electronic documents that may require verification and approval processes not currently covered by government regulations. In scenarios where e-documents need to be signed or authenticated, the voice authentication system 400 verifies the identity of the signatory by matching their voice sample with the stored voice signature. This method ensures that the signatory is indeed the authorized individual, thereby maintaining the integrity and compliance of the document handling process. This application is particularly relevant in legal and financial sectors where the authenticity of e-documents is important, even in the absence of specific governmental approval for voice authentication methods.

In the healthcare sector, the voice authentication system 400 can be utilized for the legal identification of individuals calling into doctor's offices and healthcare facilities. When a patient calls for consultation or to access personal medical records, the system verifies the caller's identity by comparing their voice against a stored voice signature associated with their healthcare profile. This additional layer of authentication helps protect sensitive patient information and ensures compliance with healthcare privacy regulations like HIPAA in the United States, which mandates stringent measures for patient data security.

The voice authentication system 400 also offers a novel application in national identification systems, similar to Aadhaar in India, which traditionally rely on biometrics such as fingerprints or iris scans. By integrating voice biometrics, the system provides a unique, non-intrusive, and easily accessible method for citizens to authenticate their identity for services like voting, accessing government benefits, or any other civil activities requiring verification. This application of the voice authentication system 400 could revolutionize how identity verification is conducted on a national scale, offering an alternative that can be particularly useful in scenarios where physical contact is a concern or where traditional biometric devices are not available.

Thus, the voice authentication system 400 of the present disclosure can be applied to various practical scenarios. These implementations demonstrate the versatility and effectiveness of the voice authentication system 400 in enhancing compliance, ensuring secure access to sensitive information, and broadening the applicability of biometric verification across crucial sectors. By using the inherent capabilities of the voice authentication system 400 to process and verify voice data accurately, each use case benefits from enhanced security, improved user convenience, and adherence to regulatory standards.

While the present disclosure has been described in detail with reference to certain embodiments, it should be appreciated that the present disclosure is not limited to those embodiments. In view of the present disclosure, many modifications and variations may be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

What is claimed is:

1. A voice authentication system comprising a server comprising one or more processors and a memory storing instructions that, when executed by the one or more processors, cause the server to:

receive voice data of a user enunciating a predetermined sequence of speech elements, wherein the predetermined sequence of speech elements is configured to capture a defined range of voiced sounds produced by the user;

pre-emphasize the received voice data;

frame the pre-emphasized voice data into overlapping time frames;

apply a window function to each time frame to reduce boundary discontinuities;

perform a Fourier transform on each windowed time frame to convert to a frequency domain representation;

apply a set of band-pass filters modelling human auditory perception to the frequency domain representation;

performing a decorrelation transform to derive Mel-Frequency Cepstral Coefficients (MFCCs), wherein the MFCCs constitute extracted voice features;

derive a voice signature for the user by performing statistical modelling of the extracted voice features using a Gaussian Mixture Model (GMM), wherein the voice signature is representative of at least one of tonal, timbral, and temporal characteristics of the user's voiced speech;

store the derived voice signature in a database;

receive a verification voice sample of the user enunciating a predetermined sub-set of speech elements;

process the verification voice sample using the same pre-emphasis, framing, windowing, Fourier transform, band-pass filtering, decorrelation transform, and MFCC extraction steps to extract verification voice features;

compare the extracted verification voice features with the stored voice signature; and authenticate the user based on the comparison.

2. The voice authentication system according to claim 1, wherein the predetermined sequence of speech elements comprises a series of spoken numerals.

3. The voice authentication system according to claim 2, wherein the series of spoken numerals includes numerals from 0 to 9.

4. The voice authentication system according to claim 1, wherein the instructions for comparing the verification voice sample cause the server to:

extract voice features from the verification voice sample;

compare the extracted voice features against the stored voice signature and a universal background model representing average voice characteristics; and determine a match score based on the comparison.

5. The voice authentication system according to claim 4, wherein the instructions further cause the server to authenticate the user when the match score exceeds a predetermined threshold.

6. The voice authentication system according to claim 1, wherein the instructions further cause the server to:

measure a response timing of the user enunciating the predetermined sub-set of speech elements;

determine whether the response timing exceeds a predetermined threshold;

re-prompt the user to enunciate the predetermined sub-set of speech elements again if response timing exceeds the predetermined threshold; and fail the authentication of the user if the response timing exceeds the predetermined threshold after a predefined number of re-prompts.

7. The voice authentication system according to claim 1, wherein the system is configured to provide voice authentication services to third-party systems via an application programming interface (API).

8. The voice authentication system according to claim 1, wherein the memory further stores instructions that, when executed by the one or more processors, cause the server to implement a microservices-based architecture for the voice authentication system, the microservices-based architecture comprising a plurality of independent modules for performing different tasks in the voice authentication process.

9. A method for authenticating a user by voice in a voice authentication system, the method comprising:

receiving, by a server comprising one or more processors, voice data of a user enunciating a predetermined sequence of speech elements, wherein the predetermined sequence of speech elements is configured to capture a defined range of voiced sounds produced by the user;

pre-emphasizing, by the server, the received voice data;

framing, by the server, the pre-emphasized voice data into overlapping time frames;

applying, by the server, a window function to each time frame to reduce boundary discontinuities;

performing, by the server, a Fourier transform on each windowed time frame to convert to a frequency domain representation;

applying, by the server, a set of band-pass filters modelling human auditory perception to the frequency domain representation;

performing, by the server, a decorrelation transform to derive Mel Frequency Cepstral Coefficients (MFCCs), wherein the MFCCs constitute extracted voice features;

deriving, by the server, a voice signature for the user by performing statistical modelling of the extracted voice features using a Gaussian Mixture Model (GMM), wherein the voice signature is representative of at least one of tonal, timbral, and temporal characteristics of the user's voiced speech;

storing, by the server, the derived voice signature in a database;

receiving, by the server, a verification voice sample of the user enunciating a predetermined sub-set of speech elements;

processing, by the server, the verification voice sample using the same pre-emphasis, framing, windowing, Fourier transform, band-pass filtering, decorrelation transform, and MFCC extraction steps to extract verification voice features;

comparing, by the server, the extracted verification voice features with the stored voice signature; and authenticating, by the server, the user based on the comparison.

10. The method according to claim 9, wherein the predetermined sequence of speech elements comprises a series of spoken numerals.

11. The method according to claim 10, wherein the series of spoken numerals includes numerals from 0 to 9.

12. The method according to claim 9, further comprising:

extracting, by the server, voice features from the verification voice sample;

comparing, by the server, the extracted voice features against the stored voice signature and a universal background model representing average voice characteristics; and determining, by the server, a match score based on the comparison.

13. The method according to claim 12, further comprising authenticating, by the server, the user when the match score exceeds a predetermined threshold.

14. The method according to claim 9, further comprising:

measuring, by the server, a response timing of the user enunciating the predetermined sub-set of speech elements;

determining, by the server, whether the response timing exceeds a predetermined threshold;

re-prompting, by the server, the user to enunciate the predetermined sub-set of speech elements again if response timing exceeds the predetermined threshold; and failing, by the server, the authentication of the user if the response timing exceeds the predetermined threshold after a predefined number of re-prompts.

15. The method according to claim 9, further comprising providing, by the server, voice authentication services to third-party systems via an application programming interface (API).

16. The method according to claim 9, further comprising implementing, by the server, a microservices-based architecture for the voice authentication system, the microservices-based architecture comprising a plurality of independent modules for performing different tasks in the voice authentication process.

* * * * *